United States Patent
Bang et al.

(10) Patent No.: US 11,635,301 B2
(45) Date of Patent: Apr. 25, 2023

(54) ELECTRONIC DEVICE FOR VEHICLE, AND METHOD AND SYSTEM FOR OPERATING ELECTRONIC DEVICE FOR VEHICLE

(71) Applicant: LG Electronics Inc., Seoul (KR)

(72) Inventors: Seunghwan Bang, Seoul (KR); Jinsang Lee, Seoul (KR)

(*) Notice: Subject to any disclaimer, the term of this patent is extended or adjusted under 35 U.S.C. 154(b) by 32 days.

(21) Appl. No.: 17/260,155

(22) PCT Filed: Nov. 2, 2018

(86) PCT No.: PCT/KR2018/013231
§ 371 (c)(1),
(2) Date: Jan. 13, 2021

(87) PCT Pub. No.: WO2020/091119
PCT Pub. Date: May 7, 2020

(65) Prior Publication Data
US 2021/0293562 A1    Sep. 23, 2021

(51) Int. Cl.
*G01C 21/36* (2006.01)
*B60W 60/00* (2020.01)
*G01C 21/00* (2006.01)

(52) U.S. Cl.
CPC ......... *G01C 21/367* (2013.01); *B60W 60/001* (2020.02); *G01C 21/3804* (2020.08)

(58) Field of Classification Search
CPC .............. G01C 21/367; G01C 21/3804; G01C 21/3841; G01C 21/3848; B60W 60/001; B60W 2556/45; G08G 1/0129; G08G 1/0141; G08G 1/096827; G08G 1/096844; G08G 1/0112; H04W 4/024; H04W 4/44
See application file for complete search history.

(56) References Cited

U.S. PATENT DOCUMENTS

| | | | |
|---|---|---|---|
| 6,405,128 B1 | 6/2002 | Bechtolsheim et al. | |
| 7,088,683 B2 | 8/2006 | Sawada et al. | |
| 2012/0086582 A1 | 4/2012 | Durekovic et al. | |
| 2012/0232733 A1 | 9/2012 | Herbin et al. | |
| 2017/0103571 A1 | 4/2017 | Beaurepaire | |
| 2018/0143648 A1 | 5/2018 | Kim et al. | |

(Continued)

FOREIGN PATENT DOCUMENTS

| | | | | |
|---|---|---|---|---|
| CA | 3049155 A1 | * | 7/2018 | ............. G01C 21/32 |
| CN | 107622684 | | 1/2018 | |

(Continued)

OTHER PUBLICATIONS

Extended European Search Report in European Appln. No. 18939060.2, dated Apr. 22, 2022, 16 pages.

(Continued)

*Primary Examiner* — Rami Khatib

(57) ABSTRACT

An electronic device for a vehicle includes a power supply configured to supply power, an interface configured to receive high-definition (HD) map data of a specified region from a server through a communication device and to receive traveling situation information of the vehicle, and at least one processor configured to continuously generate electronic horizon data of the specified region based on the HD map data in a state in which the power is received, and to adjust a speed of reception of the HD map data based on the traveling situation information.

18 Claims, 18 Drawing Sheets

(56) References Cited

U.S. PATENT DOCUMENTS

2021/0262815 A1* 8/2021 Lee .................. G01C 21/367
2022/0221860 A1* 7/2022 Shashua ............ G06V 20/588

FOREIGN PATENT DOCUMENTS

| EP | 2042833 | 4/2009 |
| EP | 3073224 | 9/2016 |
| JP | 2013024805 | 2/2013 |
| KR | 20100008386 | 1/2010 |
| KR | 20170126909 | 11/2017 |
| KR | 20180000672 | 1/2018 |

OTHER PUBLICATIONS

International Search Report in International Appln. No. PCT/KR2018/013231, dated Aug. 1, 2019, 9 pages (with English translation).

* cited by examiner

ELECTRONIC DEVICE FOR VEHICLE, AND METHOD AND SYSTEM FOR OPERATING ELECTRONIC DEVICE FOR VEHICLE

CROSS-REFERENCE TO RELATED APPLICATIONS

This application is a National Stage application under 35 U.S.C. § 371 of International Application No. PCT/KR2018/013231, filed on Nov. 2, 2018. The disclosure of the prior application is incorporated by reference in its entirety.

TECHNICAL FIELD

The present disclosure relates to an electronic device for a vehicle, and a method and system for operating an electronic device for a vehicle.

BACKGROUND ART

A vehicle refers to a device that carries a passenger in a direction intended by a passenger. A car is a major example of such a vehicle. In the industrial field of vehicles, application of an advanced driver assistance system (ADAS) is under active study to increase the driving convenience of users. Furthermore, the application of autonomous driving of vehicles is also under active study.

The application of ADAS or the application of autonomous driving may be configured based on map data. Conventionally, low-scale standard definition (SD) map data is provided to users while being stored in a memory installed in a vehicle. However, recently, as the need for high-scale high-definition (HD) map data has increased, map data into which a cloud service is integrated has come to be provided to users.

To process data of the application of ADAS and the application of autonomous driving based on an HD map, capability to process a large amount of data and capability to store a large amount of data are required. There is thus a need to develop technology for effectively transmitting and receiving a large amount of data of the HD map.

DISCLOSURE

Technical Problem

To overcome the aforementioned problems, the present disclosure may provide an electronic device for a vehicle for adjusting the speed of reception of high-definition (HD) map data depending on traveling situation information.

The present disclosure may provide a method of operating an electronic device for a vehicle for adjusting the speed of reception of HD map data depending on situation information.

The present disclosure may provide a system for adjusting a speed of reception of HD map data depending on traveling situation information.

It will be appreciated by persons skilled in the art that that the effects that could be achieved with the present disclosure are not limited to what has been particularly described hereinabove and other advantages of the present disclosure will be more clearly understood from the detailed description.

Technical Solution

In accordance with the present disclosure, the above and other objects can be accomplished by the provision of an electronic device for a vehicle including a power supply configured to supply power, an interface configured to receive high-definition (HD) map data of a specified region from a server through a communication device and to receive traveling situation information of the vehicle, and at least one processor configured to continuously generate electronic horizon data of the specified region based on the HD map data in a state in which the power is received, and to adjust a speed of reception of the HD map data based on the traveling situation information.

The processor may generate a signal for adjusting a bandwidth for receiving the HD map data based on the traveling situation information.

The processor may adjust a geographic range of the HD map data based on the traveling situation information.

The processor may adjust the speed of reception of the HD map data based on at least one of autonomous driving state information, manual driving state information, traveling speed information, parking operation situation information, stop situation information, or vehicle position information.

The processor may generate the electronic horizon data based on at least one of autonomous driving state information, manual driving state information, traveling speed information, parking operation situation information, stop situation information, or vehicle position information.

Details of other embodiments are included in detailed descriptions and drawings.

Advantageous Effects

As is apparent from the foregoing description, the embodiments of the present disclosure have the following one or more effects.

First, communication load may be reduced by adjusting the speed of reception of HD map data depending on traveling situation information.

Second, processing efficiency may be enhanced by generating electronic horizon data depending on traveling situation information.

It will be appreciated by persons skilled in the art that that the effects that could be achieved with the present disclosure are not limited to what has been particularly described hereinabove and other advantages of the present disclosure will be more clearly understood from the following claims.

BEST MODE

Reference will now be made in detail to exemplary embodiments of the present disclosure, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purposes of clarity and brevity. The features of the present disclosure will be more clearly understood from the accompanying drawings, and should not be understood to be limited by the accompanying drawings, and it is to be appreciated that all changes, equivalents, and substitutes that do not depart from the spirit and technical scope of the present disclosure are encompassed in the present disclosure.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected to or coupled to the other element, or intervening elements may be present. In contrast, when an element is referred to as being "directly on," "directly connected to" or "directly coupled to" another element or layer, there are no intervening elements present.

Singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

In the description below, the left side of the vehicle means the left side with respect to the travel direction of the vehicle and the right side of the vehicle means the right side with respect to the travel direction of the vehicle.

Figure 1:
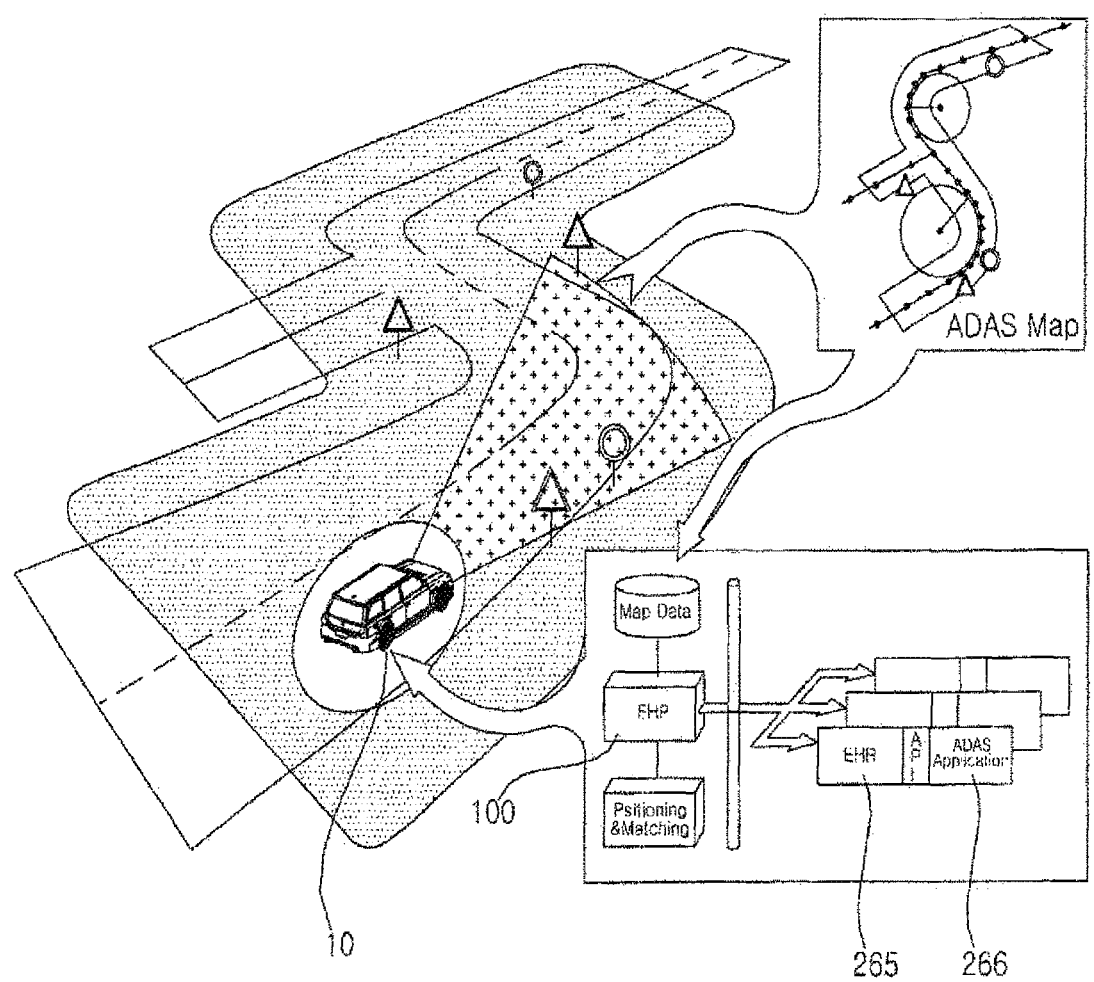
FIG. 1 is a diagram showing a vehicle that travels on a road according to an embodiment of the present disclosure.

FIG. 1 is a diagram showing a vehicle that travels on a road according to an embodiment of the present disclosure.

Referring to FIG. 1, a vehicle 10 according to an embodiment may be defined as a form of a transport that travels on a road or rails. The vehicle 10 may be interpreted as including an automobile, a train, or a motorcycle. Hereinafter, an autonomous driving vehicle that travels without driver manipulation for driving or a vehicle including an advanced driver assistance system (ADAS) will exemplify the vehicle 10.

The vehicle described in this specification may include a vehicle equipped with an internal combustion engine as a power source, a hybrid vehicle equipped with both an engine and an electric motor as a power source, and an electric vehicle equipped with an electric motor as a power source.

The vehicle 10 may include an electronic device 100. The electronic device 100 may be referred to as an electronic horizon provider (EHP). The electronic device 100 may be conductively connected to another electronic device inside the vehicle 10 in the state of being installed in the vehicle 10.

Figure 2:
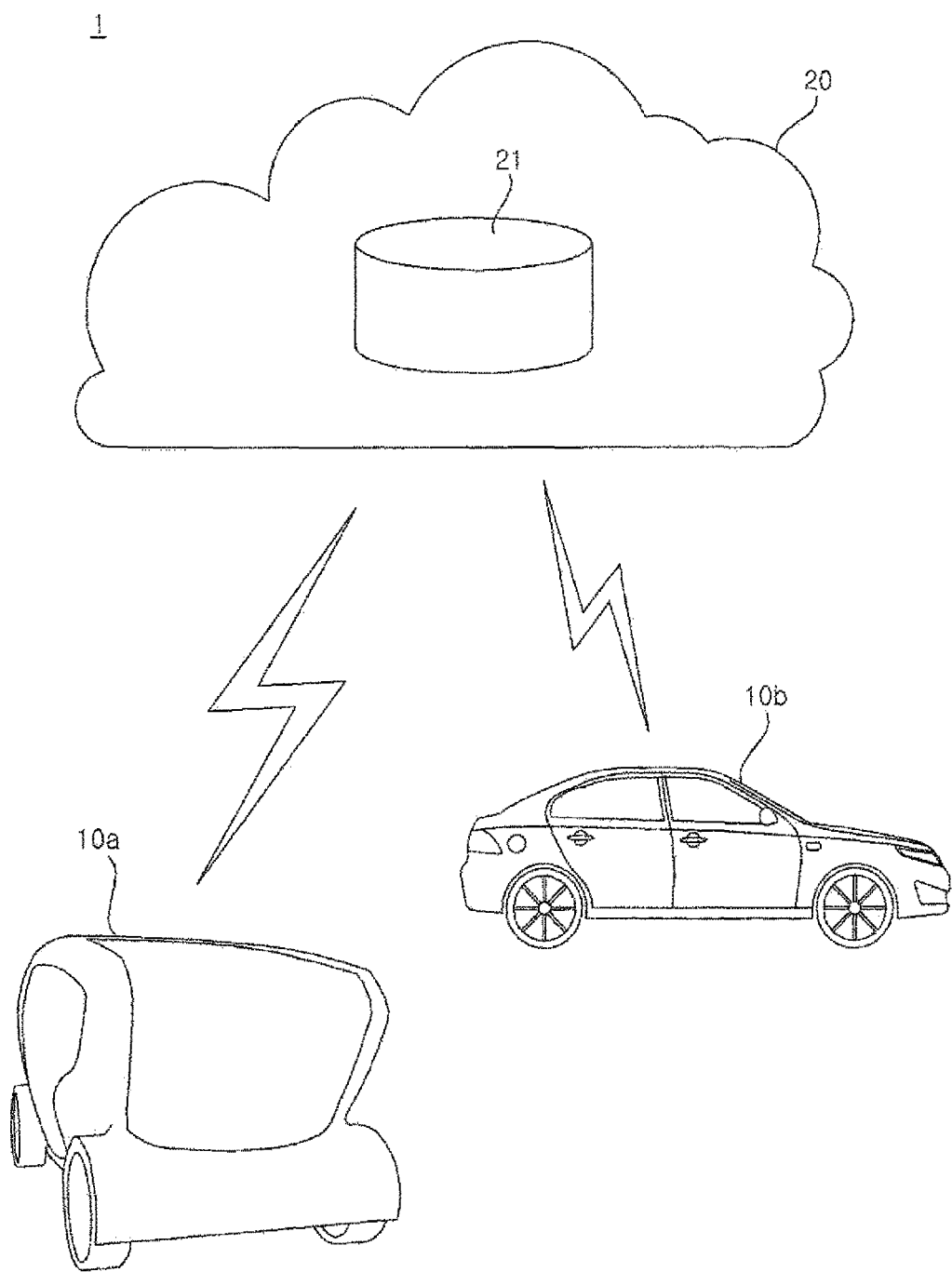
FIG. 2 is a diagram for explaining a system according to an embodiment of the present disclosure.

FIG. 2 is a diagram for explaining a system according to an embodiment of the present disclosure.

Referring to FIG. 2, a system 1 may include an infrastructure 20 and at least one vehicle 10a and 10b.

The infrastructure 20 may include at least one server 21. The server 21 may receive data generated by the vehicles 10a and 10b. The server 21 may process the received data. The server 21 may manipulate the received data.

The server 21 may receive data generated by at least one electronic device installed in the vehicles 10a and 10b. For example, the server 21 may receive data generated by at least one of an EHP, a user interface device, an object detection device, a communication device, a driving manipulation device, a main ECU, a vehicle-driving device, a travel system, a sensor, and a position-data-generating-device. The server 21 may generate big data based on the data received from a plurality of vehicles. For example, the server 21 may receive dynamic data from the vehicles 10a and 10b and may generate big data based on the received dynamic data. The server 21 may update HD map data based on the data received from a plurality of vehicles. For example, the server 21 may receive data generated by an object detection device from the EHP included in the vehicles 10a and 10b and may update HD map data.

The server 21 may provide pre-stored data to the vehicles 10a and 10b. For example, the server 21 may provide at least one of high-definition (HD) map data or standard definition (SD) map data to the vehicles 10a and 10b. The server 21 may classify the map data into map data for respective sections, and may provide only the map data corresponding to a section requested by the vehicles 10a and 10b. The HD map data may be referred to as high-precision map data.

The server 21 may provide data that is processed or manipulated by the server 21 to the vehicles 10a and 10b. The vehicles 10a and 10b may generate a travel control signal based on data received from the server 21. For example, the server 21 may provide the HD map data to the vehicles 10a and 10b. For example, the server 21 may provide dynamic data to the vehicles 10a and 10b.

Figure 3:
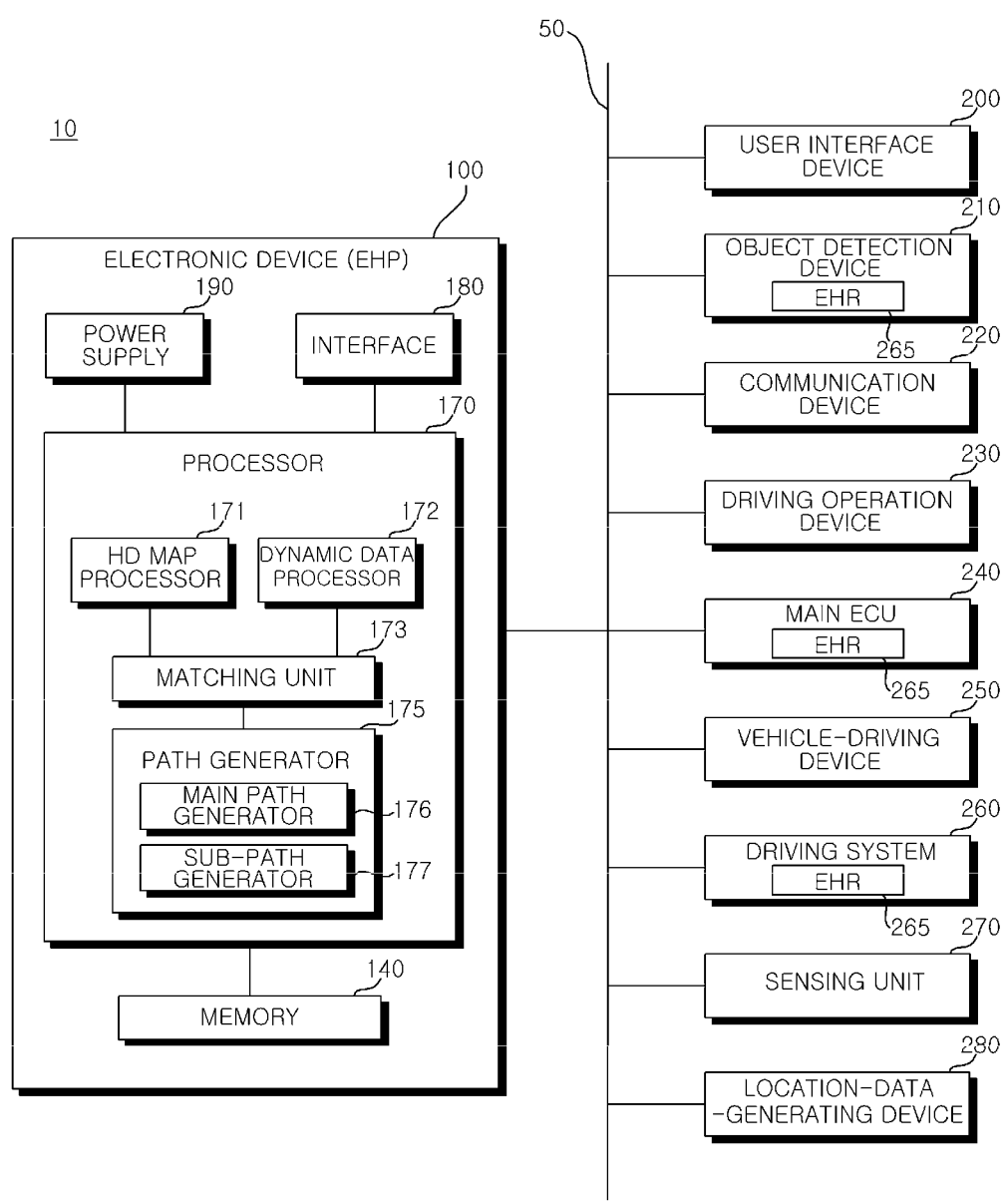
FIG. 3 is a diagram for explaining a vehicle including an electronic device according to an embodiment of the present disclosure.

FIG. 3 is a diagram for explaining a vehicle including an electronic device according to an embodiment of the present disclosure.

Figure 4:
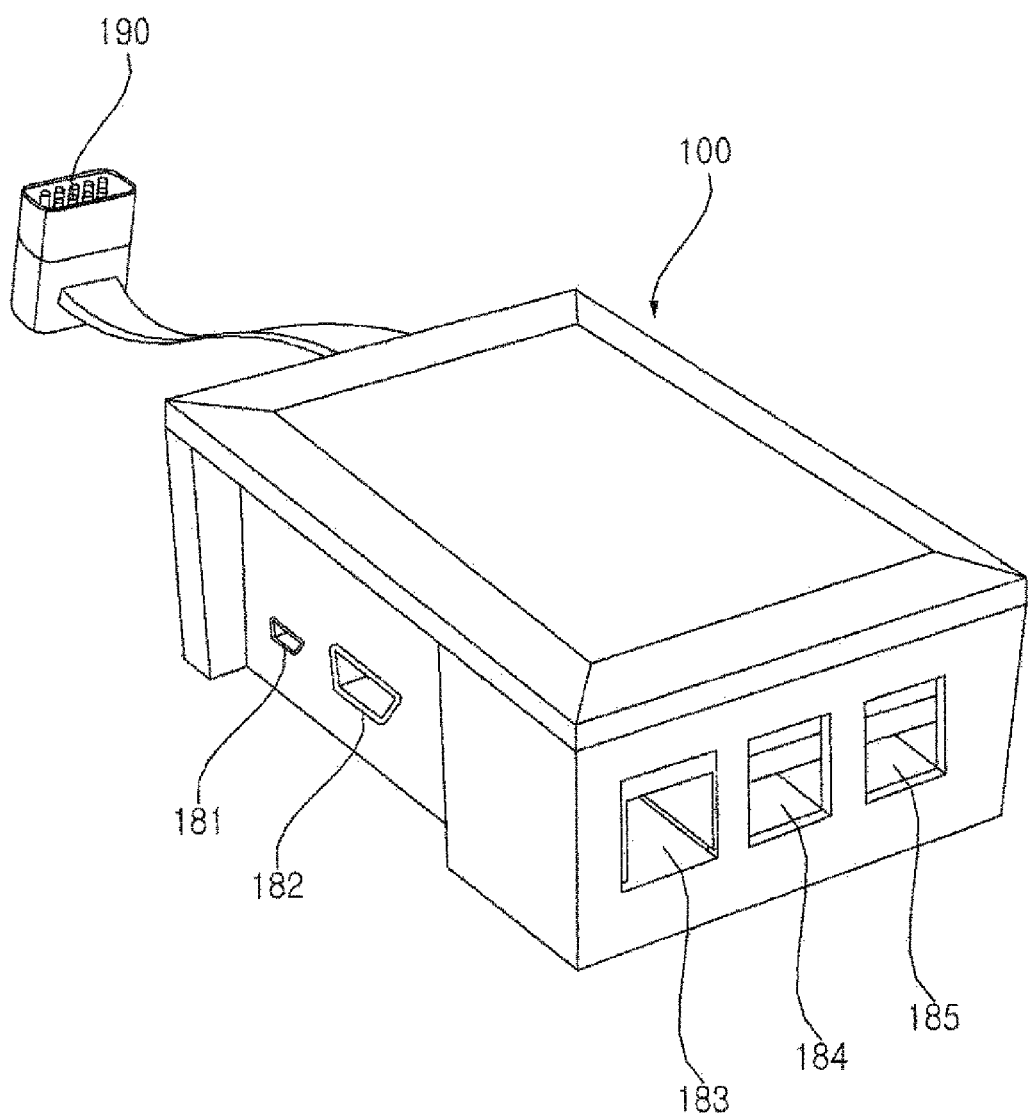
FIG. 4 is diagram showing an example of the outer appearance of an electronic device according to an embodiment of the present disclosure.

FIG. 4 is diagram showing an example of the outer appearance of an electronic device according to an embodiment of the present disclosure.

Referring to FIGS. 3 and 4, the vehicle 10 may include the electronic device 100, a user interface device 200, an object detection device 210, a communication device 220, a driving manipulation device 230, a main electronic control unit (ECU) 240, a vehicle-driving device 250, a travel system 260, a sensor 270, and a position-data-generating-device 280.

The electronic device 100 may be referred to as an electronic horizon provider (EHP). The electronic device 100 may generate electronic horizon data and may provide the same to at least one electronic device included in the vehicle 10.

The electronic horizon data may be described as driving plan data used to generate a travel control signal of the vehicle 10 in the travel system 260. For example, the electronic horizon data may be understood as driving plan data within a range to a horizon from the point where the vehicle 10 is positioned. Here, the horizon may be understood as a point a preset distance ahead of the point at which the vehicle 10 is positioned based on a preset travel path. The horizon may refer to a point that the vehicle 10 is capable of reaching after a predetermined time from the point at which the vehicle 10 is positioned along the preset traveling path. Here, the travel path may refer to a travel path to a final destination, and may be set by user input.

The electronic horizon data may include horizon map data and horizon path data.

The horizon map data may include at least one of topology data, ADAS data, HD map data, or dynamic data. In some embodiments, the horizon map data may include a plurality of layers. For example, the horizon map data may include a first layer matching the topology data, a second layer matching the ADAS data, a third layer matching the HD map data, and a fourth layer matching the dynamic data. The horizon map data may further include static object data.

The topology data may be described as a map made by connecting middle parts of roads. The topology data may be appropriate to broadly indicate the position of a vehicle and may be configured in the form of data that is mainly used in a navigation device for a driver. The topology data may be understood as data about road information other than information on lanes. The topology data may be generated based on data received from the infrastructure 20. The topology data may be based on data generated by the infrastructure 20. The topology data may be based on data stored in at least one memory included in the vehicle 10.

The ADAS data may refer to data related to information on a road. The ADAS data may include at least one of data on a slope of a road, data on a curvature of a road, or data on a speed limit of a road. The ADAS data may further include data on a no-passing zone. The ADAS data may be based on data generated by the infrastructure 20. The ADAS data may be based on data generated by the object detection device 210. The ADAS data may be referred to as road information data.

The HD map data may include topology information in units of detailed lanes of a road, information on connection between lanes, and information on characteristics for localization of a vehicle (e.g., a traffic sign, lane marking/attributes, or road furniture). The HD map data may be based on data generated by the infrastructure 20.

The dynamic data may include various pieces of dynamic information to be generated on a road. For example, the dynamic data may include information on construction, information on variable-speed lanes, information on the state of a road surface, information on traffic, and information on moving objects. The dynamic data may be based on data received from the infrastructure 20. The dynamic data may be based on data generated by the object detection device 210.

The electronic device 100 may provide map data within a range to a horizon from the point where the vehicle 10 is positioned.

The horizon path data may be described as the trajectory of the vehicle 10 within a range to a horizon from the point where the vehicle 10 is positioned. The horizon path data may include data indicating the relative probability of selection of any one among roads at a decision point (e.g., a forked road, a junction, or an intersection). The relative probability may be calculated based on the time taken to reach a final destination. For example, when a first road is selected at the decision point, if the time taken to reach a final destination is shorter than in the case in which a second road is selected, the probability of selecting the first road may be calculated to be higher than the probability of selecting the second road.

The horizon path data may include a main path and a sub path. The main path may be understood as a trajectory formed by connecting roads having a high probability of being selected. The sub path may branch from at least one decision point on the main path. The sub path may be understood as a trajectory formed by connecting roads having a low probability of being selected from at least one decision point on the main path.

The electronic device 100 may include an interface 180, a power supply 190, a memory 140, and a processor 170.

The interface 180 may exchange a signal with at least one electronic device included in the vehicle 10 in a wired or wireless manner. The interface 180 may exchange a signal with at least one of the user interface device 200, the object detection device 210, the communication device 220, the driving manipulation device 230, the main ECU 240, the vehicle-driving device 250, the travel system 260, the sensor 270, or the position-data-generating-device 280 in a wired or wireless manner. The interface 180 may include at least one of a communication module, a terminal, a pin, a cable, a port, a circuit, an element, or a device.

The power supply 190 may supply power to the electronic device 100. The power supply 190 may receive power from a power source (e.g., a battery) included in the vehicle 10 and may provide power to each unit of the electronic device 100. The power supply 190 may operate according to a control signal provided from the main ECU 240. The power supply 190 may be embodied as a switched-mode power supply (SMPS).

The memory 140 is conductively connected to the controller 170. The memory 140 may store default data for a unit, control data for controlling the operation of the unit, and input and output data. The memory 140 may be any of various storage devices in hardware, such as read only memory (ROM), random access memory (RAM), erasable and programmable ROM (EPROM), flash drive, and hard drive. The memory 140 may store various data for the overall operation of the vehicle 100, such as programs for processing or controlling in the controller 170.

The processor 170 may be conductively connected to the interface 180 and the power supply 190 and may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

The processor 170 may be driven by power provided from the power supply 190. The processor 170 may continuously generate electronic horizon data in the state in which the power supply 190 supplies power.

The processor 170 may generate electronic horizon data. The processor 170 may generate electronic horizon data. The processor 170 may generate horizon path data.

The processor 170 may generate electronic horizon data by applying a traveling situation of the vehicle 10. For example, the processor 170 may generate the electronic horizon data based on traveling direction data and traveling speed data of the vehicle 10.

The processor 170 may combine the generated electronic horizon data with the pre-generated electronic horizon data. For example, the processor 170 may connect horizon map data generated at a first time with horizon map data generated at a second time in terms of position. For example, the processor 170 may connect horizon path data generated at a first time with horizon path data generated at a second time in terms of position.

The processor 170 may provide electronic horizon data. The processor 170 may provide the electronic horizon data to at least one of the travel system 260 or the main ECU 240 through the interface 180.

The processor 170 may include the memory 140, an HD map processor 171, a dynamic data processor 172, a matcher 173, and a path generator 175.

The HD map processor 171 may receive HD map data from the server 21 through the communication device 220. The HD map processor 171 may store the HD map data. In some embodiments, the HD map processor 171 may process and manipulate the HD map data.

The dynamic data processor 172 may receive dynamic data from the object detection device 210. The dynamic data processor 172 may receive the dynamic data from the server 21. The dynamic data processor 172 may store the dynamic data. In some embodiments, the dynamic data processor 172 may process and manipulate the dynamic data.

The matcher 173 may receive an HD map from the HD map processor 171. The matcher 173 may receive the dynamic data from the dynamic data processor 172. The matcher 173 may generate horizon map data by matching the HD map data and the dynamic data.

In some embodiments, the matcher 173 may receive topology data. The matcher 173 may receive ADAS data. The matcher 173 may generate horizon map data by matching topology data, ADAS data, HD map data, and dynamic data.

The path generator 175 may generate horizon path data. The path generator 175 may include a main path generator 176 and a sub path generator 177. The main path generator 176 may generate main path data. The sub path generator 177 may generate sub path data.

The electronic device 100 may include at least one printed circuit board (PCB). The interface 180, the power supply 190, and the processor 170 may be conductively connected to the PCB.

In some embodiments, the electronic device 100 may be integrated into the communication device 220. In this case, the vehicle 10 may include the communication device 220 as a lower-ranking component of the electronic device 100.

The user interface device 200 may be a device for communication between the vehicle 10 and a user. The user interface device 200 may receive user input and may provide information generated by the vehicle 10 to a user. The vehicle 10 may embody a user interface (UI) or user experience (UX) through the user interface device 200.

The object detection device 210 may detect an object outside the vehicle 10. The object detection device 210 may include at least one of a camera, a RADAR, a LiDAR, an ultrasonic sensor, or an infrared sensor. The object detection device 210 may provide data on an object, generated based on a sensing signal generated by a sensor, to at least one electronic device included in a vehicle.

The object detection device 210 may generate dynamic data based on a sensing signal for sensing an object. The object detection device 210 may provide the dynamic data to the electronic device 100.

The object detection device 210 may receive electronic horizon data. The object detection device 210 may include an electronic horizon re-constructor (EHR) 265. The EHR 265 may convert the electronic horizon data into the data format to be used in the object detection device 210.

The communication device 220 may exchange a signal with a device positioned outside the vehicle 10. The communication device 220 may exchange a signal with at least one of an infrastructure (e.g., a server) or other vehicles. The communication device 220 may include at least one of a transmission antenna and a reception antenna for communication, and a radio frequency (RF) circuit or an RF device for embodying various communication protocols.

The driving manipulation device 230 may be a device for receiving user input for driving. In the case of a manual mode, the vehicle 10 may be driven based on a signal provided by the driving manipulation device 230. The driving manipulation device 230 may include a steering input device (e.g., a steering wheel), an acceleration input device (e.g., an accelerator pedal), and a brake input device (e.g., a brake pedal).

The main ECU 240 may control the overall operation of at least one electronic device included in the vehicle 10.

The main ECU 240 may receive electronic horizon data. The main ECU 240 may include an electronic horizon re-constructor (EHR) 265. The EHR 265 may convert the electronic horizon data into a data format to be used in the main ECU 240.

The vehicle-driving device 250 may be a device for electrical control of various devices in the vehicle 10. The vehicle-driving device 250 may include a powertrain driver, a chassis driver, a door/window driver, a safety device driver, a lamp driver, and a conditioning driver. The powertrain driver may include a power source driver and a transmission driver. The chassis driver may include a steering driver, a brake driver, and a suspension driver.

The travel system 260 may perform a traveling operation of the vehicle 10. The travel system 260 may provide a control signal to at least one of a powertrain driver or a chassis driver of the vehicle-driving device 250, and may move the vehicle 10.

The travel system 260 may receive electronic horizon data. The travel system 260 may include an electronic horizon re-constructor (EHR) 265. The EHR 265 may convert the electronic horizon data into a data format to be used in an ADAS application and an autonomous driving application.

The travel system 260 may include at least one of an ADAS application or an autonomous driving application. The travel system 260 may generate a travel control signal using at least one of the ADAS application and the autonomous driving application.

The sensor 270 may sense the state of a vehicle. The sensor 270 may include at least one of an inertial navigation unit (IMU) sensor, a collision sensor, a wheel sensor, a speed sensor, an inclination sensor, a weight detection sensor, a heading sensor, a position module, a vehicle forward/backward sensor, a battery sensor, a fuel sensor, a tire sensor, a steering sensor using rotation of a steering wheel, a vehicle interior temperature sensor, a vehicle interior humidity sensor, an ultrasonic sensor, an illumination sensor, an accelerator pedal position sensor, or a brake pedal position sensor. The inertial navigation unit (IMU) sensor may include one or more of an acceleration sensor, a gyro sensor, and a magnetic sensor.

The sensor 270 may generate data on the state of the vehicle based on a signal generated by at least one sensor. The sensor 270 may acquire a sensing signal for sensing vehicle posture information, vehicle motion information, vehicle yaw information, vehicle roll information, vehicle pitch information, vehicle collision information, vehicle direction information, vehicle angle information, vehicle speed information, vehicle acceleration information, vehicle inclination information, vehicle forward/backward information, battery information, fuel information, tire information, vehicle lamp information, vehicle interior temperature information, vehicle interior humidity information, steering wheel rotation angle, vehicle external illumination, the pressure applied to an accelerator pedal, the pressure applied to a brake pedal, and the like.

In addition, the sensor 270 may further include an accelerator pedal sensor, a pressure sensor, an engine rotation speed sensor, an air flow sensor (AFS), an air temperature sensor (ATS), a water temperature sensor (WTS), a throttle position sensor (TPS), a TDC sensor, and a crank angle sensor (CAS).

The sensor 270 may generate vehicle state information based on sensing data. The vehicle state information may be information generated based on data detected by various sensors included in a vehicle.

For example, the vehicle state information may include vehicle posture information, vehicle speed information, vehicle inclination information, vehicle weight information, vehicle direction information, vehicle battery information, vehicle fuel information, vehicle tire air-pressure information, vehicle steering information, vehicle interior temperature information, vehicle interior humidity information, pedal position information, and vehicle engine temperature information.

The position-data-generating-device 280 may generate position data of the vehicle 10. The position-data-generating-device 280 may include at least one of a global positioning system (GPS) or a differential global positioning system (DGPS). The position-data-generating-device 280 may generate position data of the vehicle 10 based on a signal generated by at least one of the GPS or the DGPS. In some embodiments, the position-data-generating-device 280 may correct the position data based on at least one of an inertial measurement unit (IMU) of the sensor 270 or a camera of the object detection device 210.

The vehicle 10 may include an internal communication system 50. A plurality of electronic devices included in the vehicle 10 may exchange a signal using the internal communication system 50 as a medium. The signal may include data. The internal communication system 50 may use at least one communication protocol (e.g., CAN, LIN, FlexRay, MOST, or Ethernet).

Figure 5A:
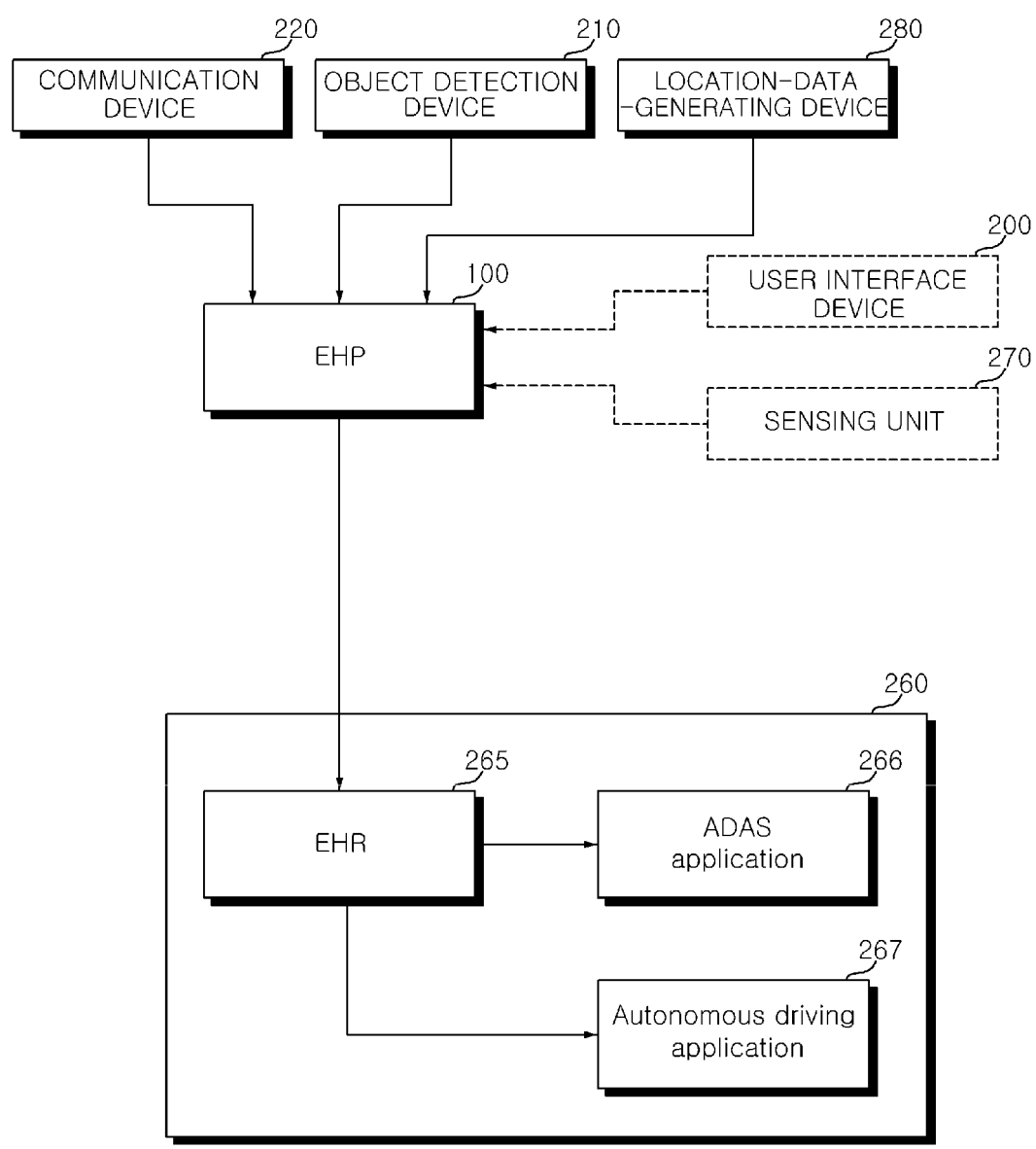
FIGS. 5A to 5C are flowcharts of a signal inside a vehicle including an electronic device according to an embodiment of the present disclosure.

FIG. 5A is a flowchart of a signal inside a vehicle including an electronic device according to an embodiment of the present disclosure.

Referring to FIG. 5A, the electronic device 100 may receive HD map data from the server 21 through the communication device 220.

The electronic device 100 may receive dynamic data from the object detection device 210. In some embodiments, the electronic device 100 may also receive dynamic data from the server 21 through the communication device 220.

The electronic device 100 may receive position data of a vehicle from the position-data-generating-device 280.

In some embodiments, the electronic device 100 may receive a signal based on user input through the user interface device 200. In some embodiments, the electronic device 100 may receive vehicle state information from the sensor 270.

The electronic device 100 may generate electronic horizon data based on HD map data, dynamic data, and position data. The electronic device 100 may match the HD map data, the dynamic data, and the position data with each other to generate horizon map data. The electronic device 100 may generate horizon path data on a horizon map. The electronic device 100 may generate main path data and sub path data on the horizon map.

The electronic device 100 may provide electronic horizon data to the travel system 260. The EHR 265 of the travel system 260 may convert the electronic horizon data into a data format appropriate for applications 266 and 267. The applications 266 and 267 may generate a travel control signal based on the electronic horizon data. The travel system 260 may provide the travel control signal to the vehicle-driving device 250.

The travel system 260 may include at least one of an ADAS application 266 or an autonomous driving application 267. The ADAS application 266 may generate a control signal for assisting the driver in driving of the vehicle 10 through the driving manipulation device 230 based on the electronic horizon data. The autonomous driving application 267 may generate a control signal for moving the vehicle 10 based on the electronic horizon data.

Figure 5B:
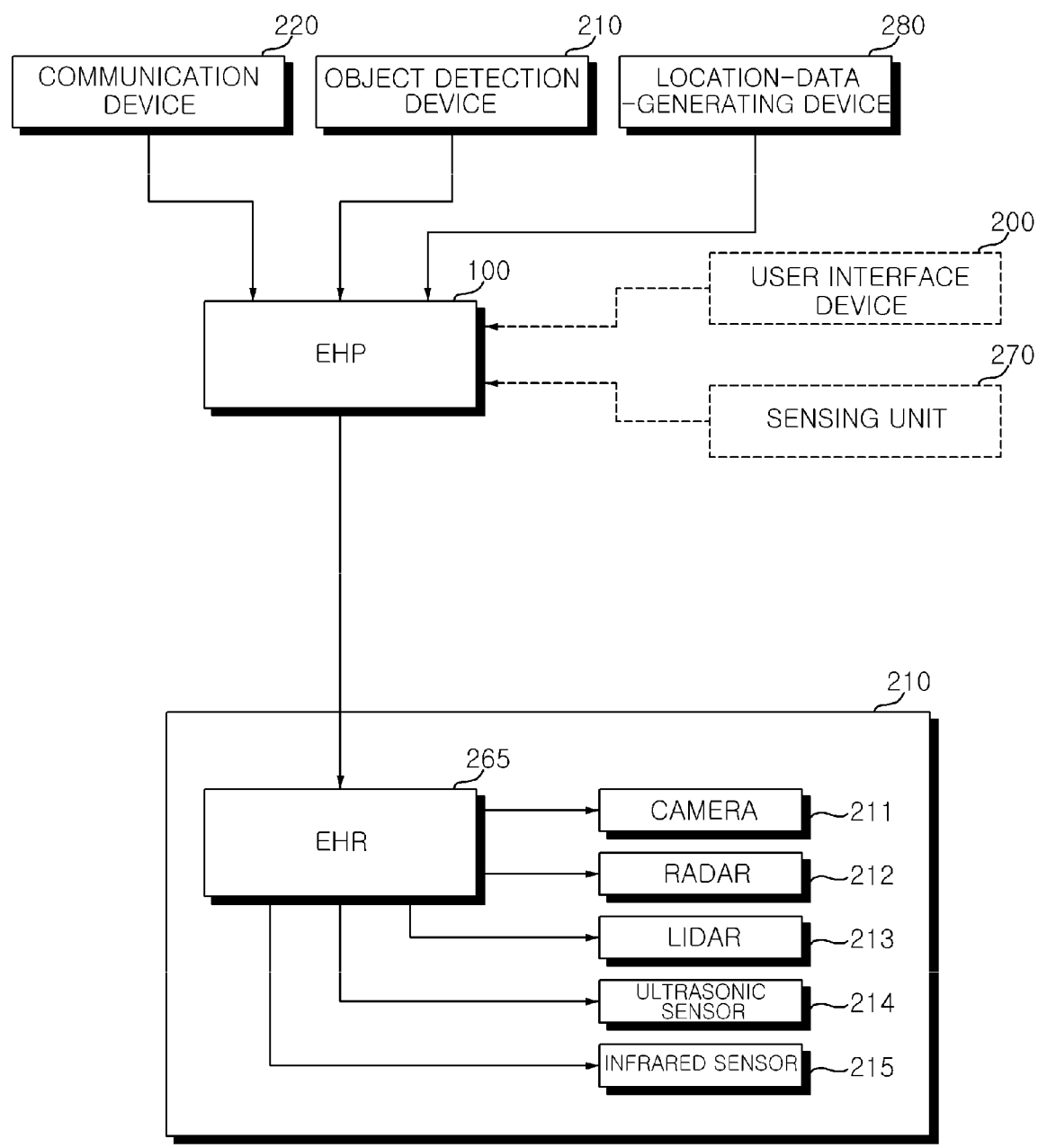

FIG. 5B is a flowchart of a signal inside a vehicle including an electronic device according to an embodiment of the present disclosure.

With reference to FIG. 5B, the embodiment of the present disclosure will be described in terms of differences from FIG. 5A. The electronic device 100 may provide the electronic horizon data to the object detection device 210. The EHR 265 of the object detection device 210 may convert the electronic horizon data into a data format appropriate for the object detection device 210. The object detection device 210 may include at least one of a camera 211, a RADAR 212, a LiDAR 213, an ultrasonic sensor 214, or an infrared sensor 215. The electronic horizon data, the data format of which is converted by the EHR 265, may be provided to at least one of the camera 211, the RADAR 212, the LiDAR 213, the ultrasonic sensor 214, or the infrared sensor 215. At least one of the camera 211, the RADAR 212, the LiDAR 213, the ultrasonic sensor 214, or the infrared sensor 215 may generate data based on the electronic horizon data.

Figure 5C:
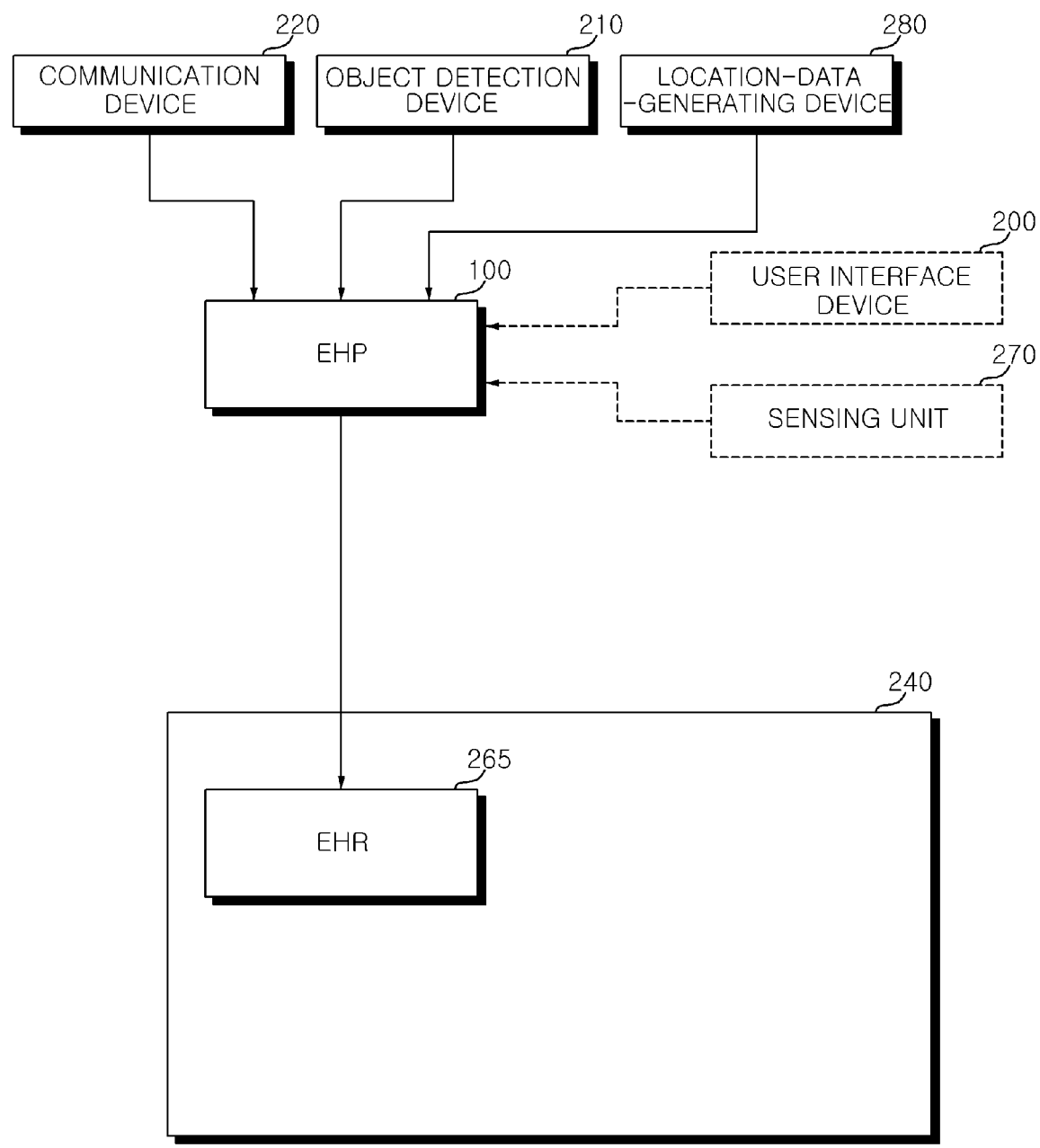

FIG. 5C is a flowchart of a signal inside a vehicle including an electronic device according to an embodiment of the present disclosure.

With reference to FIG. 5C, the embodiment of the present disclosure will be described in terms of differences from FIG. 5A. The electronic device 100 may provide electronic horizon data to the main ECU 240. The EHR 265 of the main ECU 240 may convert the electronic horizon data into a data format appropriate for the main ECU 240. The main ECU 240 may generate a control signal based on the electronic horizon data. For example, the main ECU 240 may generate a control signal for controlling at least one of the user interface device 180, the object detection device 210, the communication device 220, the driving manipulation device 230, the vehicle-driving device 250, the travel system 260, the sensor 270, or the position-data-generating-device 280 based on the electronic horizon data.

Figure 6A:
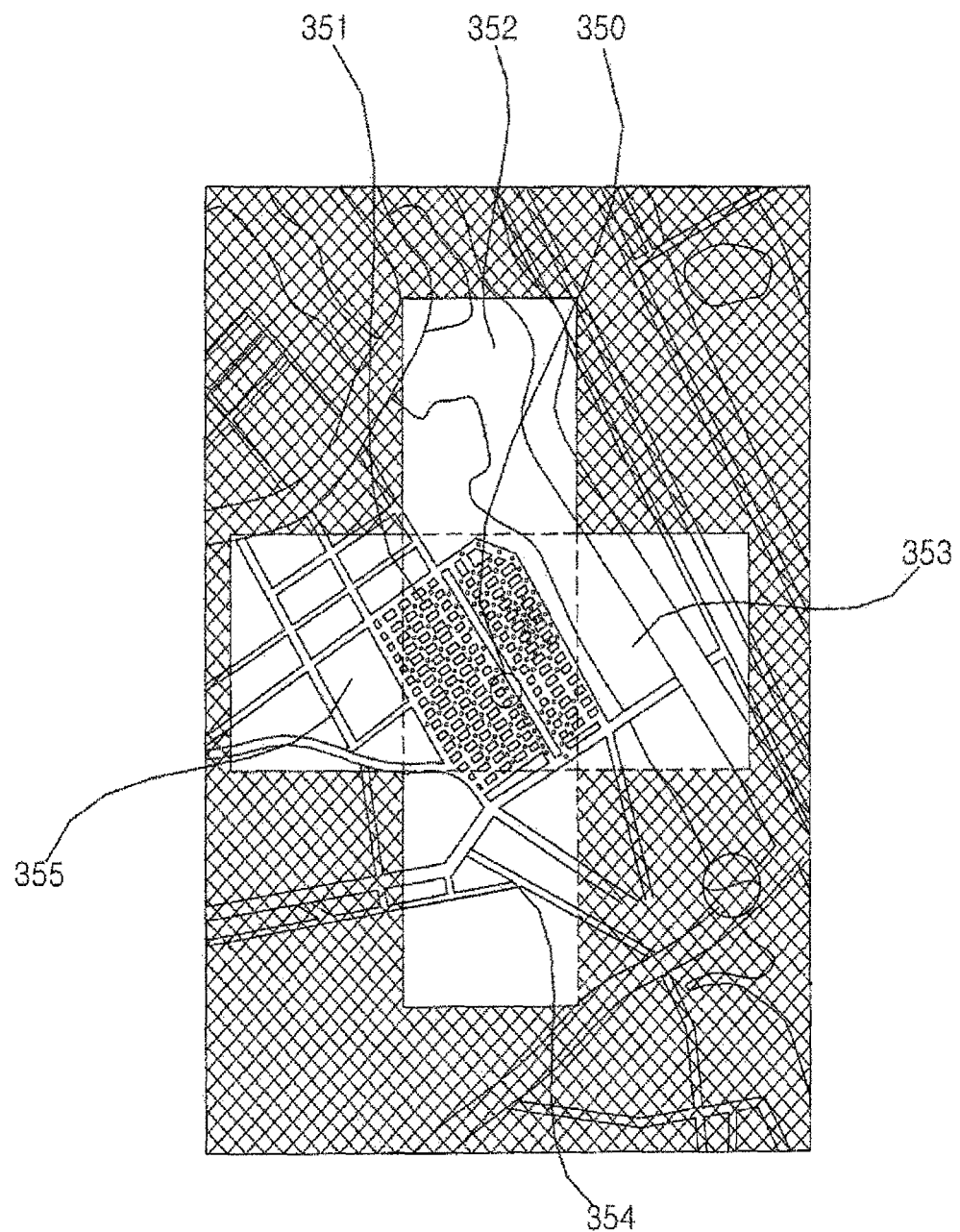
FIGS. 6A and 6B are diagrams for explaining an operation of receiving high-definition (HD) map data according to an embodiment of the present disclosure.
Figure 6B:
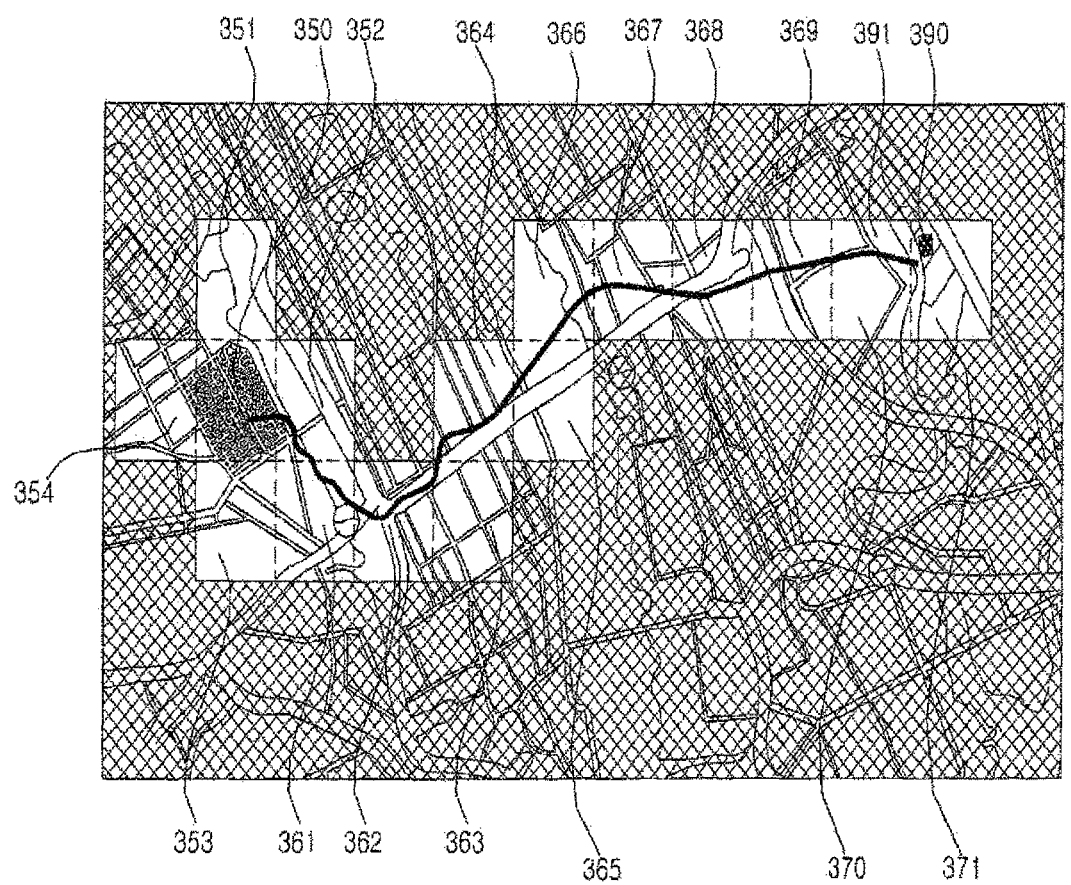

FIGS. 6A and 6B are diagrams for explaining an operation of receiving HD map data according to an embodiment of the present disclosure.

The server 21 may divide the HD map data in units of HD map tiles and may provide the divided HD map data to the electronic device 100. The processor 170 may download the HD map data in units of HD map tiles from the server 21 through the communication device 220.

An HD map tile may be defined as sub HD map data obtained by geographically dividing an entire HD map into rectangular shapes. All HD map data may be acquired by connecting all HD map tiles. The HD map data is high-scale data, and thus the vehicle 10 requires a high-performance controller to download all of the HD map data and to use the downloaded HD map data by the vehicle 10. As communication technologies have been developed, the vehicle 10 may download and use the HD map data in the form of HD map tiles and may thus obviate a high-performance controller rather than requiring inclusion of the high-performance controller, and thus may effectively process data.

The processor 170 may store the downloaded HD map tile in the memory 140. The processor 170 may delete the stored HD map tile. For example, the processor 170 may delete the HD map tile when the vehicle 10 moves out of a section corresponding to the HD map tile. For example, the processor 170 may delete the HD map tile when a preset time elapses since the HD map tile was stored.

FIG. 6A is a diagram for explaining an operation of receiving HD map data when there is no preset destination.

Referring to FIG. 6A, when there is no preset destination, the processor 170 may receive a first HD map tile 351 including a position 350 of the vehicle 10. The server 21 may receive data on the position 350 of the vehicle 10 from the vehicle 10 and may provide the first HD map tile 351 including a position 250 of the vehicle 10 to the vehicle 10. The processor 170 may receive HD map tiles 352, 353, 354, and 355 around the first HD map tile 351. For example, the processor 170 may receive the HD map tiles 352, 353, 354, and 355 that neighbor upper, lower, left, and right sides of the first HD map tile 351, respectively. In this case, the processor 170 may receive five HD map tiles in total. For example, the processor 170 may further receive an HD map tile positioned in a diagonal direction from the first HD map tile 351 along with the HD map tiles 352, 353, 354, and 355 that neighbor upper, lower, left, and right sides of the first HD map tile 351, respectively. In this case, the processor 170 may receive nine HD map tiles in total.

FIG. 6B is a diagram for explaining an operation of receiving HD map data when there is a preset destination.

Referring to FIG. 6B, when there is a preset destination, the processor 170 may receive tiles 350, 352, 361, 362, 363, 364, 365, 366, 367, 368, 369, 370, and 371 associated with a path 391 to the position 350 of the vehicle 10. The processor 170 may receive the plurality of tiles 350, 352, 361, 362, 363, 364, 365, 366, 367, 368, 369, 370, and 371 to cover the path 391.

The processor 170 may receive all of the tiles 350, 352, 361, 362, 363, 364, 365, 366, 367, 368, 369, 370, and 371, which cover the path 391, at one time.

While the vehicle 10 moves along the path 391, the processor 170 may separately receive all of the tiles 350, 352, 361, 362, 363, 364, 365, 366, 367, 368, 369, 370, and 371. While the vehicle 10 moves along the path 391, the processor 170 may receive only at least some of the tiles 350, 352, 361, 362, 363, 364, 365, 366, 367, 368, 369, 370, and 371 based on the position of the vehicle 10. Then, the processor 170 may continuously receive tiles and may delete the pre-received tiles while the vehicle 10 moves.

Figure 6C:
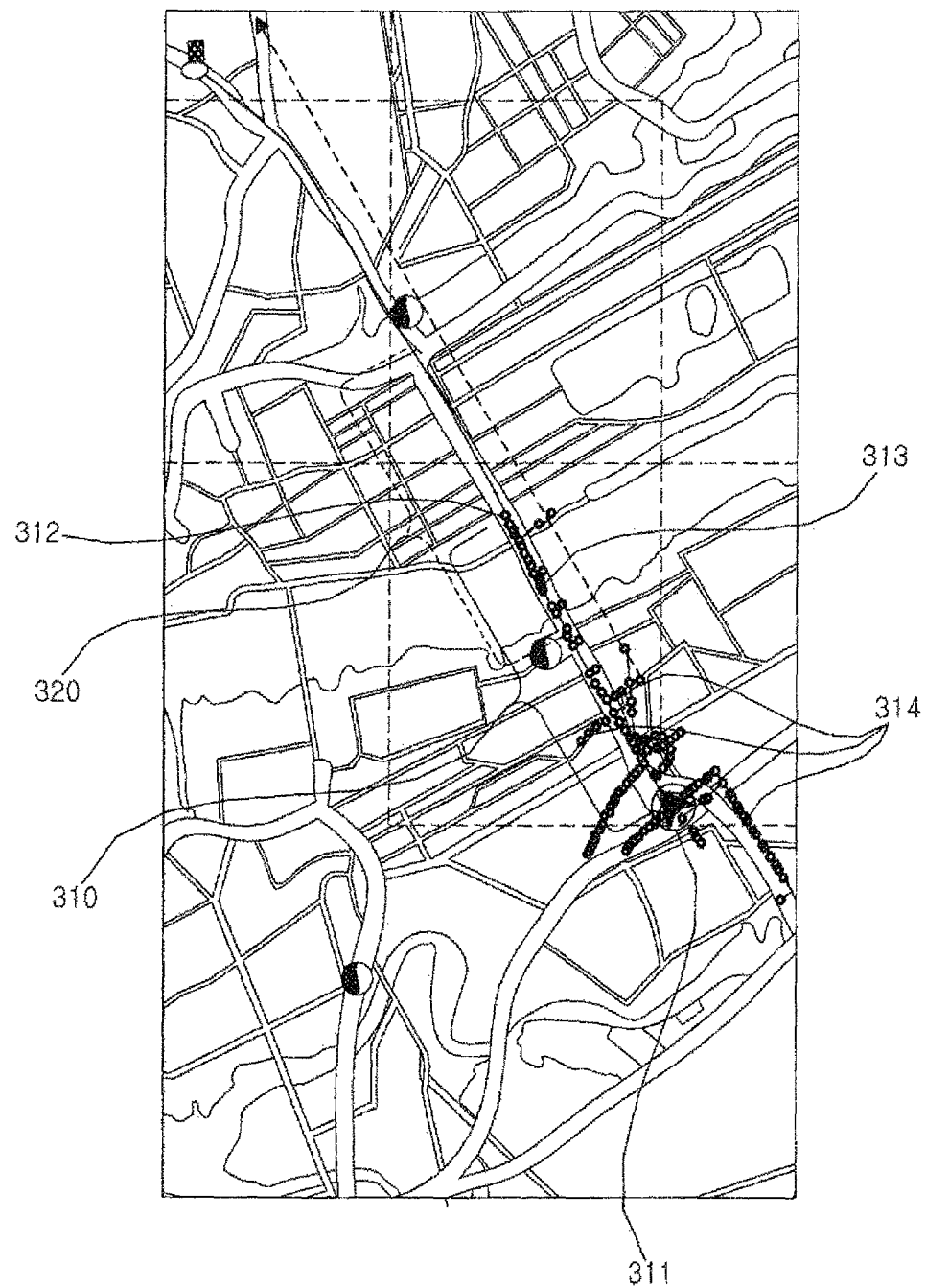
FIG. 6C is a diagram for explaining an operation of generating electronic horizon data according to an embodiment of the present disclosure.

FIG. 6C is a diagram for explaining an operation of generating electronic horizon data according to an embodiment of the present disclosure.

Referring to FIG. 6C, the processor 170 may generate the electronic horizon data based on HD map data.

The vehicle 10 may travel in the state in which a final destination is set. The final destination may be set based on user input received through the user interface device 200 or the communication device 220. In some embodiments, the final destination may also be set by the travel system 260.

In the state in which the final destination is set, the vehicle 10 may be positioned within a preset distance from a first point while traveling. When the vehicle 10 is positioned within a preset distance from the first point, the processor 170 may generate electronic horizon data using a first point as a start point and a second point as an end point. Each of the first point and the second point may be one point on a path toward the final destination. The first point may be described as the point at which the vehicle 10 is currently positioned or is to be positioned in the near future. The second point may be described as the aforementioned horizon.

The processor 170 may receive an HD map of a region including a section to the second point from the first point. For example, the processor 170 may make a request for an HD map of a region within a predetermined radius from a section to the second point from the first point and may receive the HD map.

The processor 170 may generate electronic horizon data on a region including the section to the second point from the first point based on the HD map. The processor 170 may generate horizon map data of the region including the section to the second point from the first point. The processor 170 may generate horizon path data of the region including the section to the second point from the first point. The processor 170 may generate data on a main path 313 of the region including the section to the second point from the first point. The processor 170 may generate data on a sub path 314 of the region including the section to the second point from the first point.

When the vehicle 10 is positioned within a preset distance from the second point, the processor 170 may generate electronic horizon data using a second point as a start point and a third point as an end point. Each of the second point and the third point may be one point on a path toward a final destination. The second point may be described as a point at which the vehicle 10 is currently positioned or is to be positioned in the near future. The third point may be described as the aforementioned horizon. The electronic horizon data using the second point as a start point and the third point as an end point may be geographically connected to the aforementioned electronic horizon data using the first point as a start point and the second point as an end point.

The aforementioned operation of generating the electronic horizon data using the first point as a start point and the second point as an end point may be applied in the same way to the operation of generating the electronic horizon data using the second point as a start point and the third point as an end point.

In some embodiments, the vehicle 10 may also travel in the state in which a final destination is not set.

Figure 7:
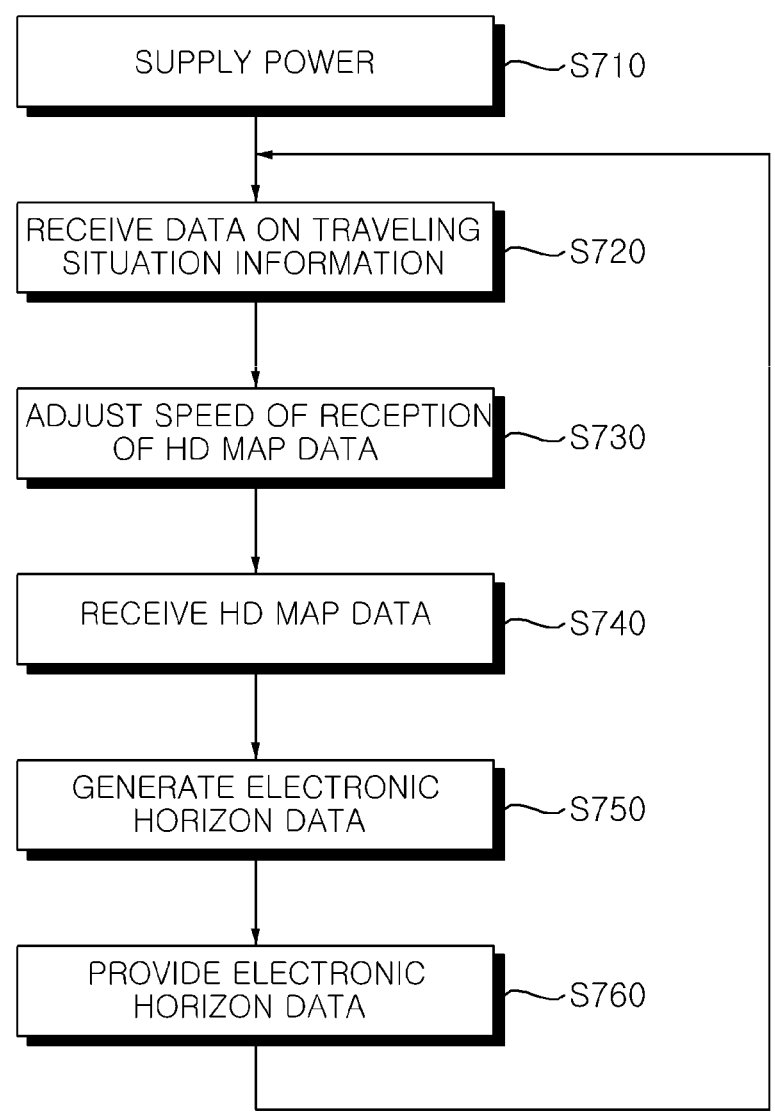
FIG. 7 is a flowchart of an electronic device according to an embodiment of the present disclosure.

FIG. 7 is a flowchart of an electronic device according to an embodiment of the present disclosure.

Referring to FIG. 7, the processor 170 may receive power through the power supply 190 (S710). The power supply 190 may supply power to the processor 170. When the vehicle 10 is turned on, the processor 170 may receive power received from a battery included in the vehicle 10 through the power supply 190. When receiving power, the processor 170 may perform a processing operation.

The processor 170 may receive data of traveling situation information of the vehicle 10 through the interface 180 (S720). The interface 180 may receive data of traveling situation information of the vehicle 10. The traveling situation information of the vehicle 10 may include at least one of autonomous driving state information, manual driving state information, traveling speed information, parking operation situation information, stop situation information, or vehicle position information. The interface 180 may transmit data of traveling situation information to the processor 170.

The processor 170 may adjust the speed of reception of HD map data based on the traveling situation information (S730). The speed of reception of the HD map data may be defined as the amount of HD map data received per unit time. When the electronic device 100 and the communication device 220 are of a separable type, the processor 170 may generate a signal for adjusting the speed of reception of the HD map data and may transmit the signal to the communication device 220 through the interface 180. When the electronic device 100 and the communication device 220 are of an integrated type, the processor 170 may control the speed of reception of the HD map data.

The adjusting operation S730 may include an operation of adjusting a bandwidth for receiving the HD map data based on the traveling situation information. The processor 170 may adjust the bandwidth for receiving the HD map data based on the traveling situation information. For example, the processor 170 may adjust the bandwidth in order to change a communication method (e.g., 5G or LTE) for receiving HD map data based on the traveling situation information. For example, the processor 170 may adjust the bandwidth in order to change a frequency used to receive the HD map data based on the traveling situation information. As such, the speed of reception of the HD map data may be adjusted by adjusting the bandwidth.

The adjusting operation S730 may further include an operation of adjusting the geographic range of the HD map data based on the traveling situation information. The processor 170 may adjust the geographic range of the HD map data based on the traveling situation information. For example, in the case of high-speed traveling, the processor 170 may increase the geographic range of the HD map data, and in the case of low-speed traveling, the processor 170 may reduce the geographic range of the HD map data. As such, the speed of reception of the HD map data may be adjusted by adjusting the geographic range of the HD map data.

The adjusting operation S730 may further include an operation of adjusting the speed of reception of the HD map data based on at least one of autonomous driving state information, manual driving state information, traveling speed information, parking operation situation information, stop situation information, or vehicle position information. The processor 170 may adjust the speed of reception of the HD map data based on at least one of autonomous driving state information, manual driving state information, traveling speed information, parking operation situation information, stop situation information, or vehicle position information.

For example, in an autonomous driving state, the processor 170 may adjust the speed of reception of the HD map data to be higher than a manual driving state. For example, in high-speed traveling, the processor 170 may adjust the speed of reception of the HD map data to be higher than low-speed traveling. For example, when a vehicle currently performs a parking operation or is in a stationary state, the processor 170 may minimize the speed of reception of the HD map data or may not receive data. For example, when the vehicle 10 is located in a city, the processor 170 may adjust the speed of reception of the HD map data to be higher than in the case in which the vehicle 10 is located in the countryside.

The processor 170 may receive HD map data of a region specified according to a reception speed from the server 21 through the communication device 220 (S740). In the state in which the vehicle 10 travels, the interface 180 may receive the HD map data of a specified geographic region at the reception speed from the server 21 through the communication device 220. The interface 180 may receive HD map data on the vicinity of the position of the vehicle 10. The interface 180 may transmit the received HD map data to the processor 170.

The processor 170 may generate electronic horizon data of the specified region based on the HD map data (S750).

The generating operation (S750) may further include an operation of generating electronic horizon data based on at least one of autonomous driving state information, manual driving state information, traveling speed information, parking operation situation information, stop situation information, or vehicle position information. The processor 170 may generate electronic horizon data based on at least one of autonomous driving state information, manual driving state information, traveling speed information, parking operation situation information, stop situation information, or vehicle position information.

For example, in an autonomous driving state, the processor 170 may generate electronic horizon data including data of an object (e.g., a moving object) to be recognized as an obstacle while a vehicle travels. For example, in a manual driving state, the processor 170 may generate electronic horizon data including only data of an object that needs to be recognized by a driver while the vehicle travels. For example, the processor 170 may generate electronic horizon data by adjusting the length of the main path and the sub path depending on the traveling speed of the vehicle 10. For example, when the vehicle currently performs a parking operation or is in a stationary state, the processor 170 may generate electronic horizon data including at least one lane type information, information on whether a towaway zone is present, or information on a vehicle that stops in the vicinity thereof. For example, while the vehicle moves to the countryside from a city, the processor 170 may generate electronic horizon data based on road shape information for generating a horizon path. For example, while the vehicle moves to a city from the outskirt, the processor 170 may generate electronic horizon data including road shape information, landmark information, and dynamic information.

The processor 170 may provide the electronic horizon data to the travel system 260 through the interface 180 (S760). The processor 170 may provide electronic horizon data corresponding to a set geographic range to the travel system 260 through the interface 180. Then, the processor 170 may repeatedly perform operations subsequent to operation S720.

Operations S720 to S760 may be performed in the state in which power is received from the power supply 190.

Figure 8:
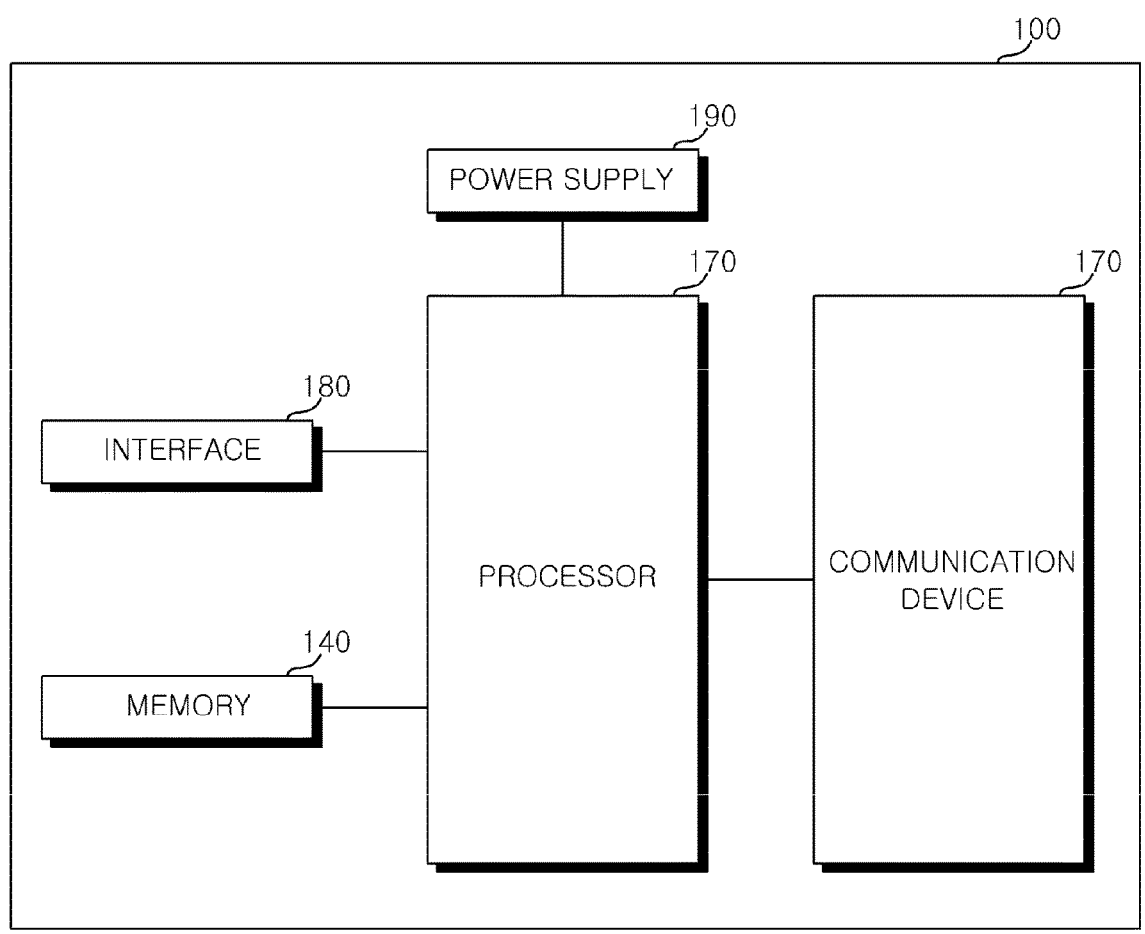
FIGS. 8 to 11B are diagrams for explaining an operation of an electronic device according to an embodiment of the present disclosure.

FIG. 8 is a diagram showing an example of a block diagram of control of an electronic device according to an embodiment of the present disclosure.

Referring to FIG. 8, the electronic device 100 may further include the communication device 220 in the electronic device 100 described above with reference to FIG. 3.

The electronic device 100 of FIG. 3 may function as an independent device that is separate from the communication device 220. In this case, the processor 170 may provide a signal to the communication device 220 through the interface 180. The communication device 220 may communicate with the server 21 based on a signal received from the electronic device 100. The processor 170 may generate a signal for adjusting the speed of reception of the HD map data and may transmit the signal to the communication device 220 through the interface 180. The communication device 220 may adjust the speed of reception of the HD map data based on the received signal.

The electronic device 100 of FIG. 8 may be integrated into the communication device 220 and may be configured as an integrated type. In this case, the processor 170 may be conductively connected to the communication device 220. The processor 170 may directly control the communication device 220. The processor 170 may control the communication device 220 to adjust the speed of reception of the HD map data.

The processor 170 may receive autonomous driving state information and traveling speed information of the vehicle 10 from at least the electronic device included in the vehicle 10 through the interface 180. When the vehicle 10 travels at a low speed equal to or less than a reference speed in an autonomous driving state, the processor 170 may reduce the geographic range of the HD map and the length of the horizon path compared with the case of high-speed travel. The processor 170 may download minimum information required to generate electronic horizon data through long-term evolution (LTE). When the vehicle 10 travels at a high speed equal to or greater than a reference speed in an autonomous driving state, the processor 170 may increase the geographic range of the HD map and the length of the horizon path compared with the case of low-speed travel. The processor 170 may rapidly download information required for electronic horizon data through fifth-generation (5G).

When the vehicle 10 travels at a low speed equal to or less than a reference speed in a manual driving state, the processor 170 may reduce the geographic range of the HD map and the length of the horizon path compared with the case of high-seed travel. The processor 170 may download minimum information required to generate electronic horizon data through long-term evolution (LTE). When the vehicle 10 travels at a high speed equal to or greater than a reference speed in a manual driving state, the processor 170 may increase the geographic range of the HD map and the length of the horizon path compared with the case of low-speed travel. The processor 170 may rapidly download information required for electronic horizon data through fifth-generation (5G). When the vehicle 10 manually travels, the processor 170 may generate electronic horizon data based on information required for manual driving. The processor 170 may provide a horizon path including dynamic information required for safe driving based on information on objects around the vehicle 10 and various real-time events.

Figure 9A:
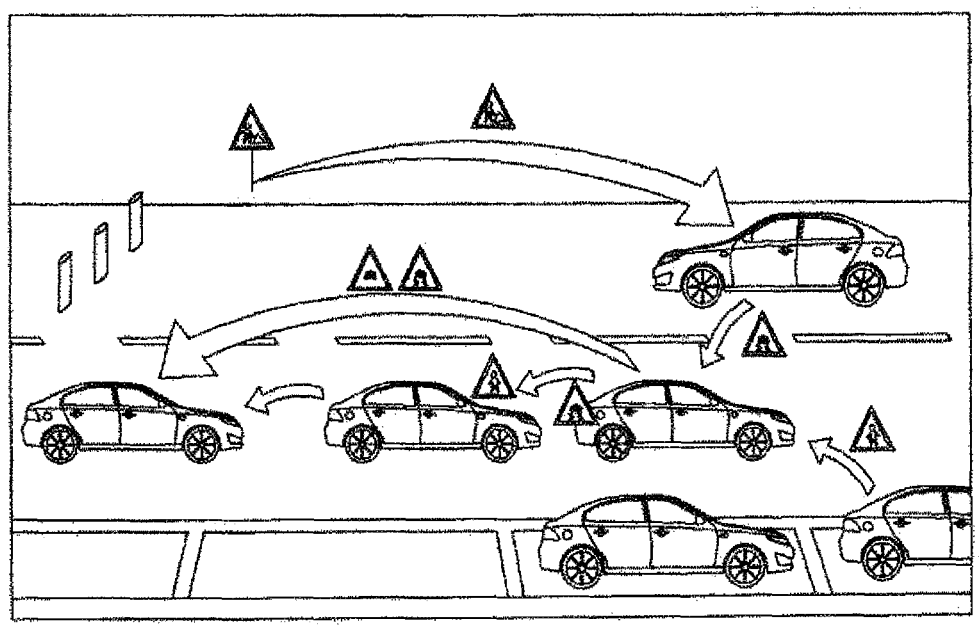
Figure 9B:
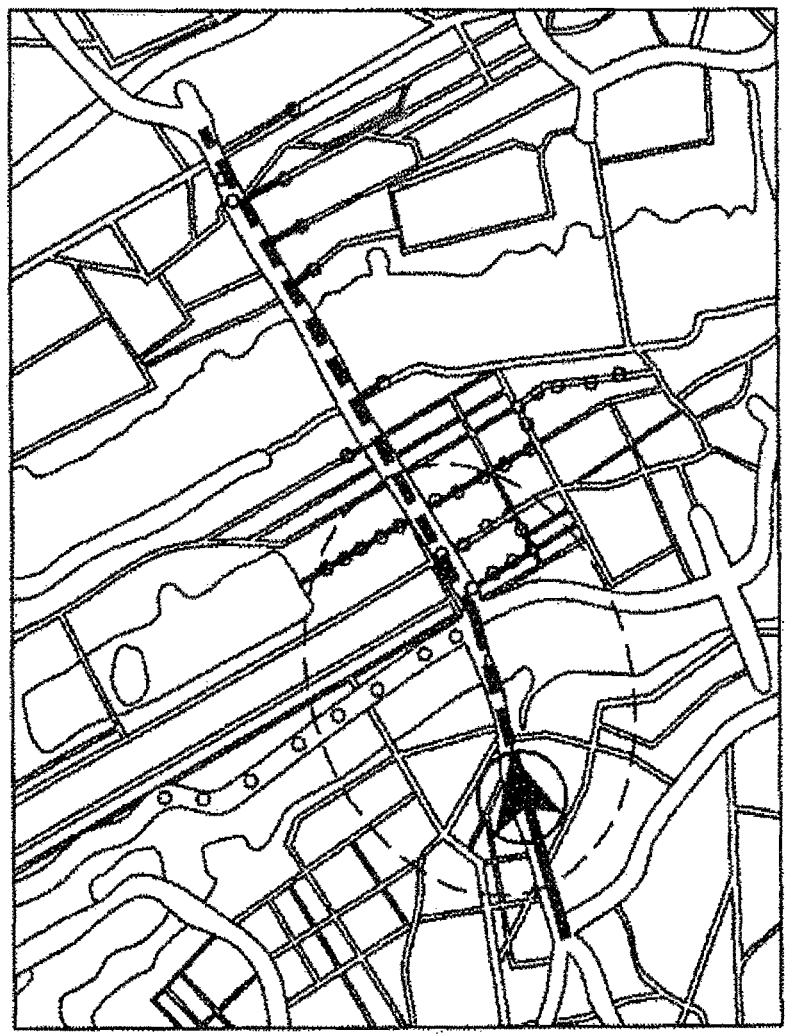

FIGS. 9A to 9B are diagrams for explaining an operation of an electronic device according to an embodiment of the present disclosure.

Referring to the drawing, the processor 170 may variably receive HD map tiles based on traveling situation information of the vehicle 10. As such, the processor 170 may adjust a communication speed and traffic depending on traveling situation information, thereby enhancing communication efficiency and processing efficiency.

The processor 170 may adjust a communication speed and traffic by adjusting the respective bandwidths of LTE and 5G. When the vehicle travels at a high speed in autonomous driving, safe and rapid data reception is the foremost consideration, so real-time high-speed communication through 5G is required in the case of high-speed traveling. When the vehicle travels at a low speed in autonomous driving, the communication load and processing load may be reduced using LTE or 3G rather than 5G. When the vehicle travels at a high speed in manual traveling, only warnings with respect to dangerous objects may be provided using LTE, without receiving all HD map data. When the vehicle travels at a low speed in manual driving, only warnings with respect to dangerous objects may be provided to a driver using LTE or 3G.

The processor 170 may variably control the download method of HD map data based on the position of the vehicle 10. For example, when the vehicle 10 moves to the countryside from a city, the processor 170 may download and manipulate the HD map data based on road shape data for generating a horizon path. For example, when the vehicle 10 enters a city from the countryside, the processor 170 may selectively download and manipulate road shape data, dynamic data, and landmark data required for traveling.

The processor 170 may variably control the download method of HD map data based on the driving mode of the vehicle 10.

For example, when the vehicle 10 travels in an autonomous driving mode, the processor 170 may download dynamic data and road shape data for generating horizon path data. The processor 170 may receive moving object information from nearby vehicles or a V2I infrastructure (RSU). When the computational load of the processor 170 is drastically increased due to excessive downloading and manipulating of HD map data, the processor 170 may reduce a geographic region of the downloaded HD map data and may reduce a recommended traveling speed.

For example, when the vehicle 10 travels in a manual driving mode, the processor 170 may download dynamic data and road shape data for generating horizon path data. The processor 170 may selectively receive information on dangers that affect travel, from information on near moving objects through V2X. When computational load of the processor 170 is drastically increased due to excessive downloading and manipulating of HD map data, the processor 170 may process only basic information required to generate a horizon path and may selectively receive additional information depending on the system situation.

Figure 10A:
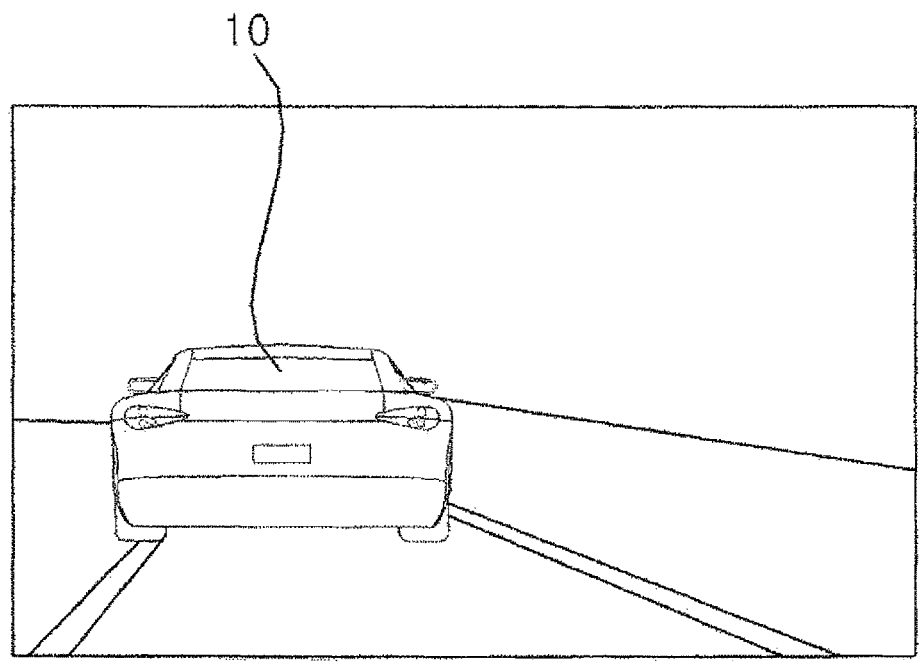
Figure 10B:
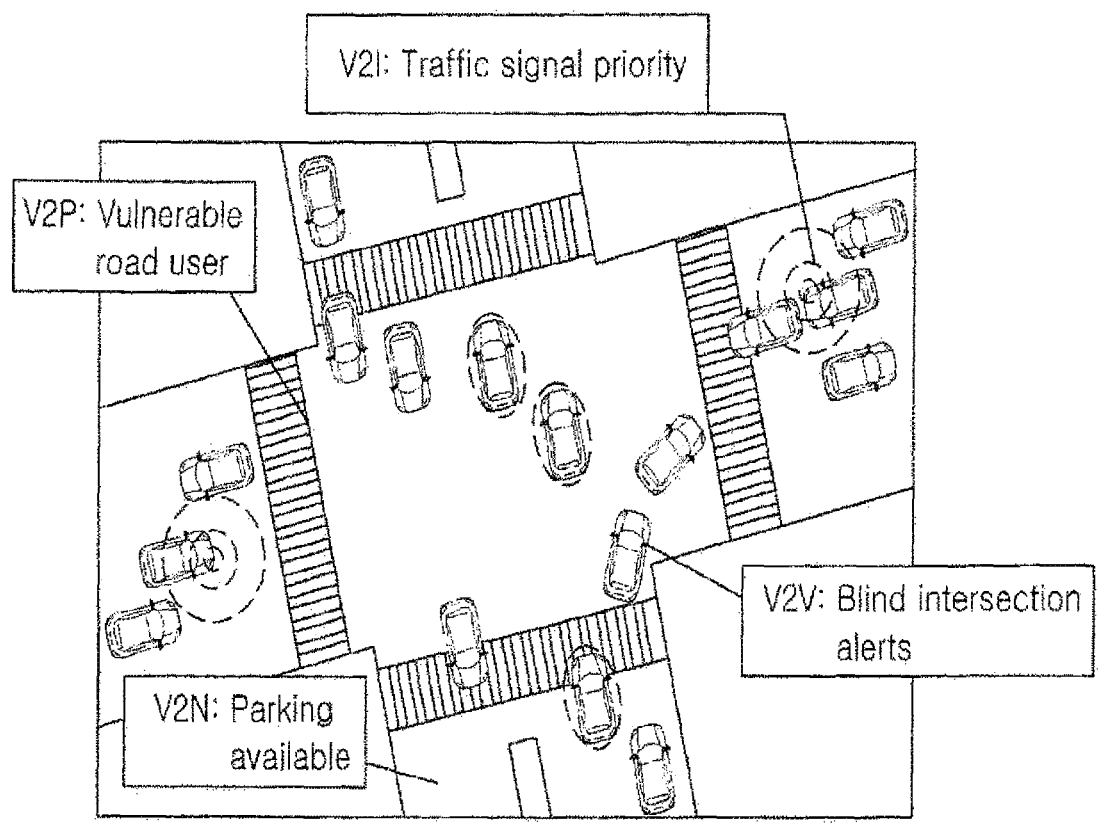

FIGS. 10A and 10B are diagrams for explaining an operation of an electronic device according to an embodiment of the present disclosure.

Referring to the drawings, as shown in FIG. 10A, when the vehicle 10 moves slowly or temporarily stops, a large amount of HD map data may not be required. In this case, the processor 170 may receive HD map data including vehicle lane information, information on whether a towaway zone is present, parking fee information, and information on other vehicles positioned around the vehicle 10. The processor 170 may provide vehicle lane information, information on whether a towaway zone is present, parking fee information, and information on other vehicles positioned around the vehicle 10 to a driver through the user interface device 200 within a horizon path range.

As shown in FIG. 10B, the processor 170 may flexibly set the length of a horizon path and may provide only information required by a driver. The electronic device 100 may provide only required information depending on the situation of a driver to facilitate temporary parking and slow movement, and may receive only a small amount of data to lower an occupancy ratio of a processor, to increase a the lifespan of the memory 140, and to reduce communication costs.

Figure 11A:
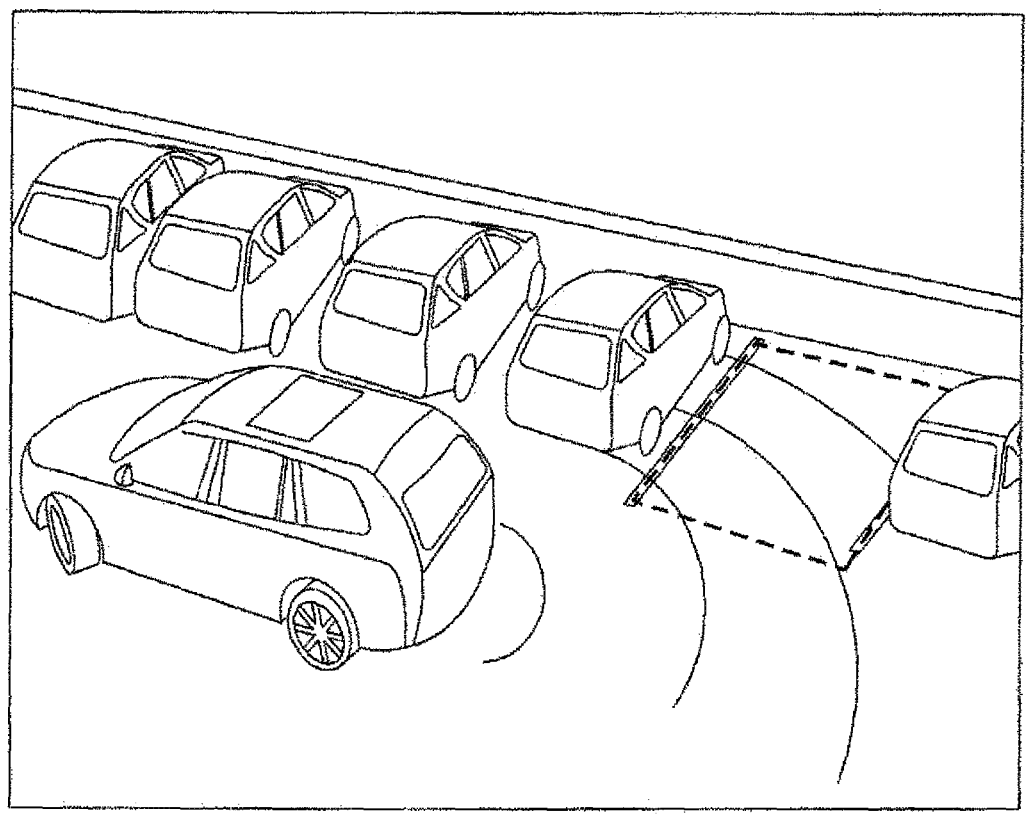
Figure 11B:
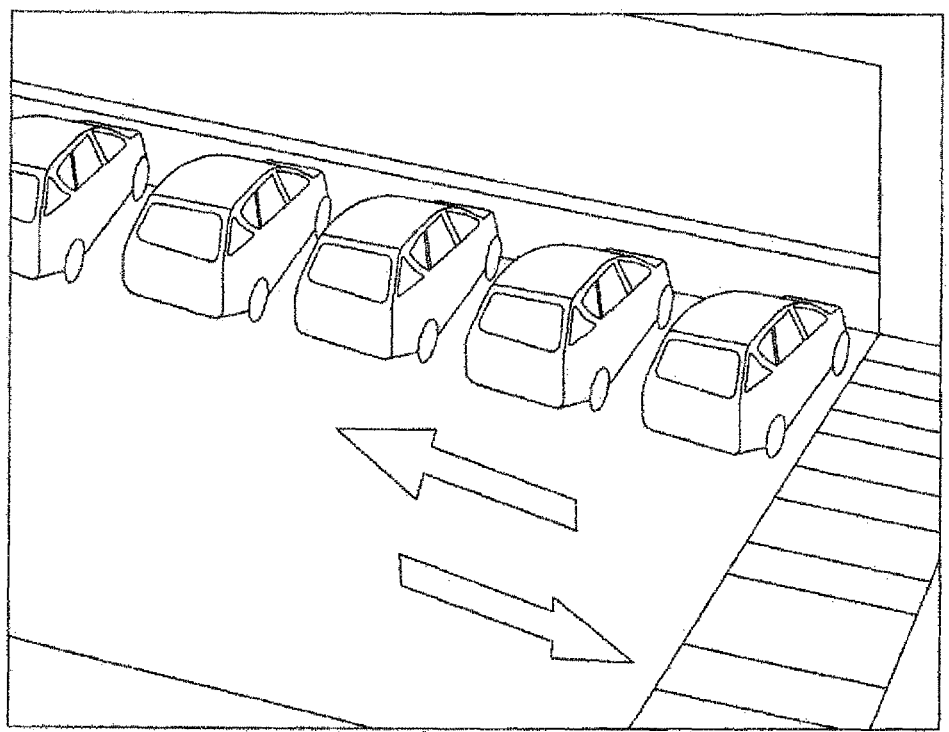

FIGS. 11A to 11B are diagrams for explaining an operation of an electronic device according to an embodiment of the present disclosure.

Referring to the drawings, the processor 170 may provide a horizon path of a rear side and a specified region inside a parking lost while the vehicle parks. In this case, when the vehicle reaches a destination and parks, the electronic device 100 does not necessarily receive a large amount of data, unlike the case in which the vehicle travels. Communication costs and the load on a processor may be reduced using a parking lot map, which is received when communication is disconnected and the vehicle enters the parking lot. In a parking mode, the processor 170 may disconnect communication irrespective of autonomous driving or manual driving and may generate electronic horizon data based on the received parking lot map data and data of the object detection device 210. The travel system 260 may receive electronic horizon data at a parking lot and may perform parking. The parking lot map data may receive the data from a server that manages a parking lot.

When the vehicle 10 reaches a destination and attempts to be parked, only parking lot map data may be required. An available parking space may be recognized in advance based on the parking lot map data. The vehicle 10 may immediately enter the available parking space recognized in advance and does not need to search an entire parking lot to find an available parking space. As shown in FIG. 11A, the vehicle 10 may search for an available parking space and may provide pieces of information required for parking to a driver using a sensor of the object detection device 210.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, carrier waves (e.g., transmission via the Internet), etc. The computer may include a processor or a controller. Accordingly, it is intended that the present disclosure cover the modifications and variations of this invention provided they come within the scope of the appended claims and their equivalents.

DESCRIPTION OF REFERENCE NUMERAL

1: System
10: Vehicle
100: Electronic device
170: Processor

What is claimed:

1. An electronic device for a vehicle, comprising:
a power supply configured to supply power;
an interface configured to receive, from a server through a communication device, high-definition (HD) map data of a specified region and to receive traveling situation information of the vehicle; and
at least one processor configured to:
continuously generate electronic horizon data of the specified region based on the HD map data in a state in which the power is received, and
adjust a speed of reception of the HD map data based on the traveling situation information,
wherein, based on a traveling speed of the vehicle being equal to or greater than a reference speed, the at least one processor is configured to increase a geographic range of the HD map data and receive the HD map data through a first communication method,
wherein, based on the traveling speed of the vehicle being less than the reference speed, the at least one processor is configured to reduce the geographic range of the HD map data and receive the HD map data through a second communication method, and
wherein the speed of reception of the HD map data in the first communication method is greater than the speed of reception of the HD map data in the second communication method.

2. The electronic device of claim 1, wherein the at least one processor adjusts a bandwidth for receiving the HD map data based on the traveling situation information.

3. The electronic device of claim 1, wherein the at least one processor adjusts the geographic range of the HD map data based on the traveling situation information.

4. The electronic device of claim 1, wherein the at least one processor adjusts the speed of reception of the HD map data based on at least one of autonomous driving state information, manual driving state information, traveling speed information, parking operation situation information, stop situation information, or vehicle position information.

5. The electronic device of claim 1, wherein the at least one processor generates the electronic horizon data based on at least one of autonomous driving state information, manual driving state information, traveling speed information, parking operation situation information, stop situation information, or vehicle position information.

6. The electronic device of claim 1, wherein the at least one processor is configured to, based on the traveling speed of the vehicle being equal to or greater than the reference speed, increase a length of horizon path included in the electronic horizon data, and
wherein the at least one processor is configured to, based on the traveling speed of the vehicle being less than the reference speed, reduce the length of horizon path included in the electronic horizon data.

7. A method of operating an electronic device for a vehicle, the method comprising:
receiving power by at least one processor;
receiving data of traveling situation information of the vehicle in a state in which the power is received, by the at least one processor;
adjusting a speed of reception of high-definition (HD) map data based on the traveling situation information in a state in which the power is received, by the at least one processor;
receiving, from a server through a communication device in the state in which the power is received, HD map data of a specified region depending on the reception speed, by the at least one processor; and
generating electronic horizon data corresponding to a geographic range based on the HD map data in the state in which the power is received, by the at least one processor,
wherein adjusting the speed of reception of the HD map data comprises:
based on a traveling speed of the vehicle being equal to or greater than a reference speed, increasing a geographic range of the HD map data and receiving the HD map data through a first communication method, by the at least one processor,
based on the traveling speed of the vehicle being less than the reference speed, reducing the geographic range of the HD map data to be reduced and receiving the HD map data through a second communication method, by the at least one processor, and wherein the speed of reception of the HD map data in the first communication method is greater than the speed of reception of the HD map data in the second communication method.

8. The method of claim 7, wherein the adjusting comprises adjusting a bandwidth for receiving the HD map data based on the traveling situation information by the at least one processor.

9. The method of claim 7, wherein the adjusting comprises adjusting a geographic range of the HD map data based on the traveling situation information.

10. The method of claim 7, wherein the adjusting comprises adjusting a speed of reception of the HD map data based on at least one of autonomous driving state information, manual driving state information, traveling speed information, parking operation situation information, stop situation information, or vehicle position information.

11. The method of claim 7, wherein the generating comprises generating the electronic horizon data based on at least one of autonomous driving state information, manual driving state information, traveling speed information, parking operation situation information, stop situation information, or vehicle position information.

12. The method of claim 7, wherein adjusting the speed of reception of the HD map data comprises:
based on the traveling speed of the vehicle being equal to or greater than the reference speed, increasing a length of horizon path included in the electronic horizon data, and
based on the traveling speed of the vehicle being less than the reference speed, reducing the length of horizon path included in the electronic horizon data.

13. A system comprising:
a server configured to provide high-definition (HD) map data; and
at least one vehicle comprising an electronic device configured to receive the HD map data, wherein the electronic device comprises:
a power supply configured to supply power;
an interface configured to receive HD map data of a specified region from a server through a communication device; and
at least one processor configured to:
continuously generate electronic horizon data of the specified region based on the HD map data in a state in which the power is received, and
adjust a speed of reception of the HD map data based on traveling situation information of the vehicle,
wherein, based on a traveling speed of the vehicle being equal to or greater than a reference speed, the at least one processor is configured to increase a geographic range of the HD map data and receive the HD map data through a first communication method,
wherein, based on the traveling speed of the vehicle being less than the reference speed, the at least one processor is configured to reduce the geographic range of the HD map data and receive the HD map data through a second communication method,
wherein the speed of reception of the HD map data in the first communication method is greater than the speed of reception of the HD map data in the second communication method.

14. The system of claim 13, wherein the at least one processor generates a signal for adjusting a bandwidth for receiving the HD map data based on the traveling situation information.

15. The system of claim 13, wherein the at least one processor adjusts the geographic range of the HD map data based on the traveling situation information.

16. The system of claim 13, wherein the at least one processor adjusts the speed of reception of the HD map data based on at least one of autonomous driving state information, manual driving state information, traveling speed information, parking operation situation information, stop situation information, or vehicle position information.

17. The system of claim 13, wherein the at least one processor generates the electronic horizon data based on at least one of autonomous driving state information, manual driving state information, traveling speed information, parking operation situation information, stop situation information, or vehicle position information.

18. The system of claim 13, wherein the at least one processor is configured to, based on the traveling speed of the vehicle being equal to or greater than the reference speed, increase a length of horizon path included in the electronic horizon data, and
wherein the at least one processor is configured to, based on the traveling speed of the vehicle being less than the reference speed, reduce the length of horizon path included in the electronic horizon data.

* * * * *